(12) United States Patent
Kammel

(10) Patent No.: US 7,266,943 B2
(45) Date of Patent: Sep. 11, 2007

(54) EXHAUST AFTER-TREATMENT SYSTEM FOR THE REDUCTION OF POLLUTANTS FROM DIESEL ENGINE EXHAUST AND RELATED METHOD

(75) Inventor: Refaat A. Kammel, Jackson, MI (US)

(73) Assignee: Converter Technology, Inc., Michigan Center, MI (US)

( * ) Notice: Subject to any disclaimer, the term of this patent is extended or adjusted under 35 U.S.C. 154(b) by 0 days.

(21) Appl. No.: 11/041,883

(22) Filed: Jan. 24, 2005

(65) Prior Publication Data

US 2005/0178111 A1 Aug. 18, 2005

Related U.S. Application Data

(63) Continuation-in-part of application No. PCT/US03/23048, filed on Jul. 24, 2003.

(60) Provisional application No. 60/454,046, filed on Mar. 12, 2003, provisional application No. 60/398,473, filed on Jul. 25, 2002.

(51) Int. Cl.
*F01N 3/00* (2006.01)
*F01N 3/02* (2006.01)

(52) U.S. Cl. .............................. 60/297; 60/311; 60/298

(58) Field of Classification Search .................. 60/295, 60/297, 311
See application file for complete search history.

(56) References Cited

U.S. PATENT DOCUMENTS 3,162,516 A * 12/1964 Dwyer ........................ 95/274
3,805,520 A * 4/1974 Becker et al. ................ 60/274
3,815,337 A * 6/1974 Lenane ......................... 96/386
4,649,703 A 3/1987 Dettling et al. ............... 60/275
4,720,972 A 1/1988 Rao et al. ..................... 60/274
4,890,455 A * 1/1990 Leonhard et al. ............. 60/275
4,950,313 A 8/1990 Dullien et al. ................. 55/97
4,969,328 A * 11/1990 Kammel ....................... 60/275
4,989,408 A * 2/1991 Leonhard et al. ............. 60/303
5,097,665 A * 3/1992 Kammel ....................... 60/275
5,121,601 A * 6/1992 Kammel ....................... 60/275
5,251,564 A * 10/1993 Rim et al. ................... 110/344
5,972,215 A * 10/1999 Kammel ...................... 210/243
5,974,791 A * 11/1999 Hirota et al. ................. 60/276
6,007,593 A 12/1999 Dullien ........................ 55/323
6,138,649 A * 10/2000 Khair et al. ........... 123/568.12
6,497,095 B2 * 12/2002 Carberry et al. .............. 60/295
6,874,315 B2 * 4/2005 Nakatani et al. .............. 60/285

FOREIGN PATENT DOCUMENTS

EP           0 280 160 A    8/1988
JP           05 195750      8/1993
WO           WO99/13961     3/1999

* cited by examiner

*Primary Examiner*—Thomas Denion
*Assistant Examiner*—Loren Edwards
(74) *Attorney, Agent, or Firm*—Harness, Dickey & Pierce, P.L.C.

(57) ABSTRACT

Exhaust after-treatment system for the reduction of particulate, $NO_x$, HC, CO, VOCs, nano-particle count and sulfur dioxide from diesel exhaust. System employs diesel oxidation catalyst, exhaust cooling system, particulate converter, soot collection chamber, soot processing drum, EGR and water scrubber.

16 Claims, 27 Drawing Sheets

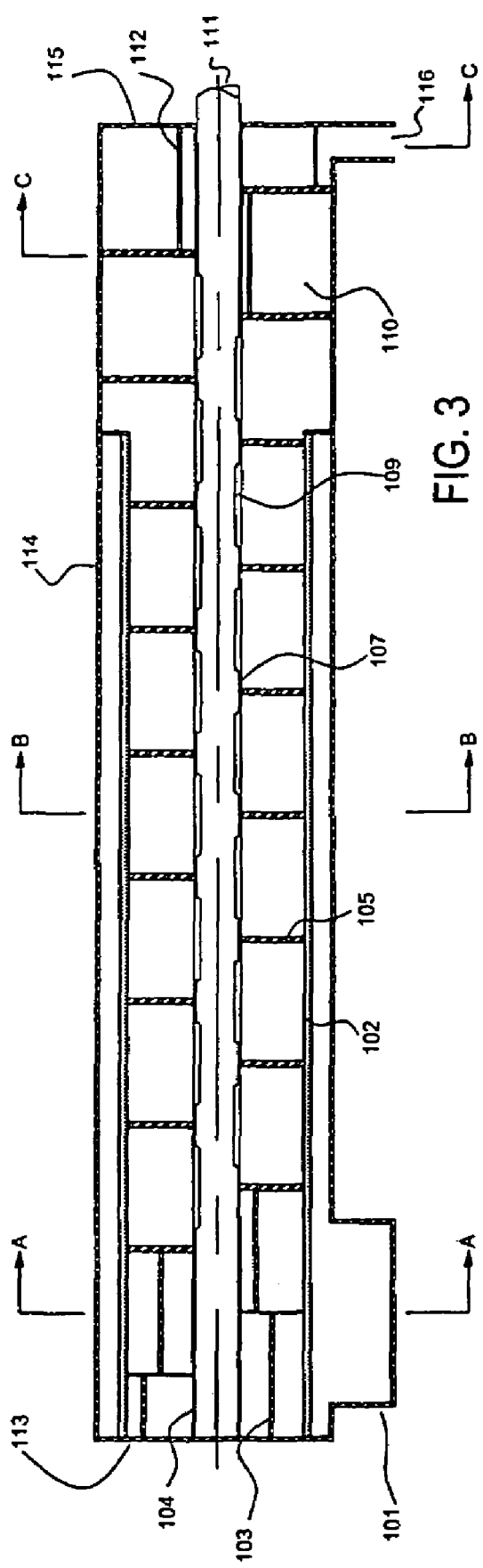
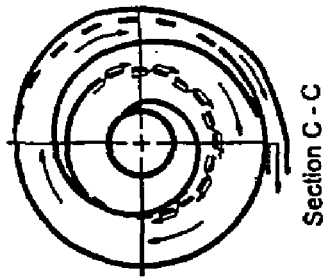
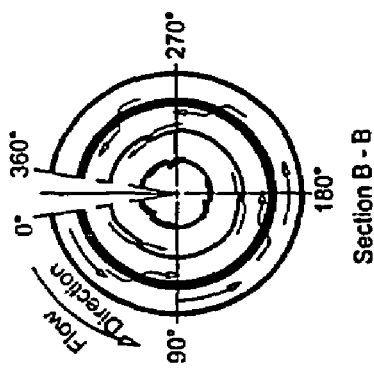
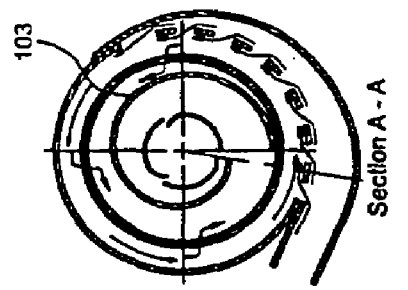
FIG. 3
FIG. 3A
FIG. 3B
FIG. 3C

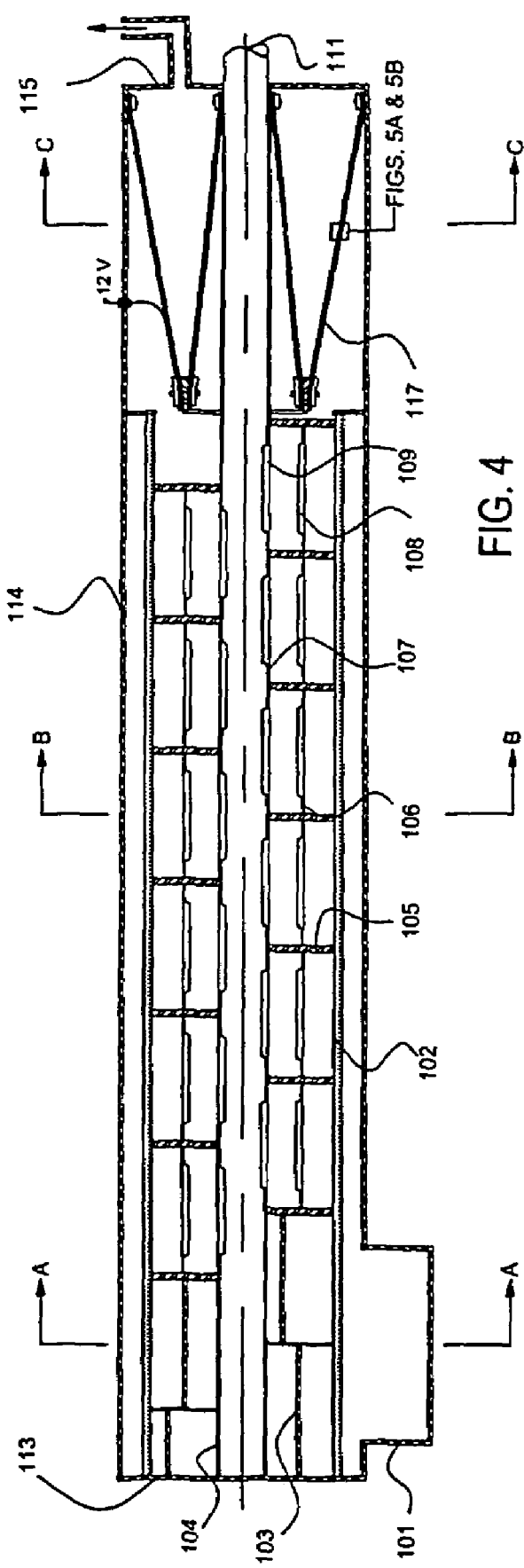
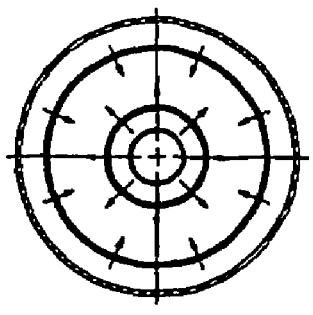
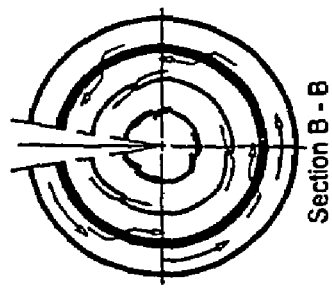
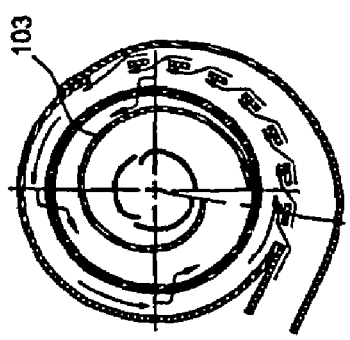
FIG. 4
FIG. 4A Section A-A
FIG. 4B Section B-B
FIG. 4C Section C-C

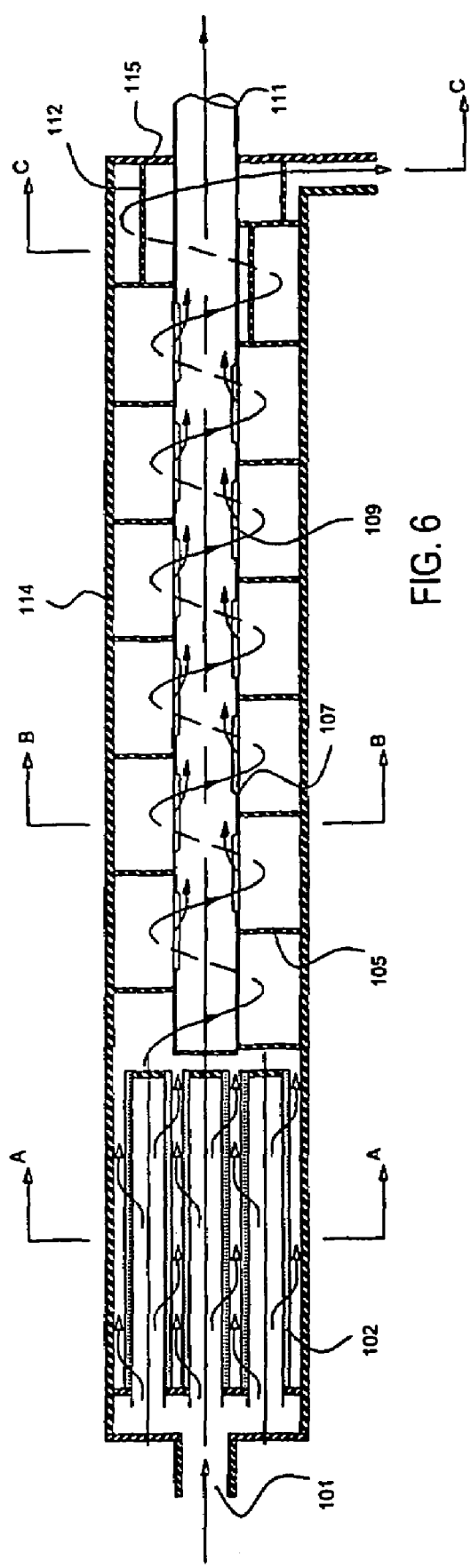
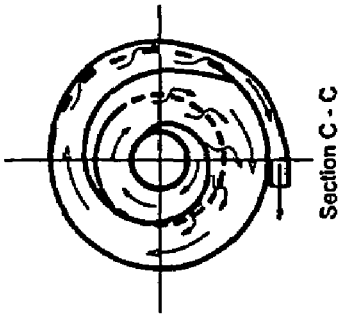
FIG. 6
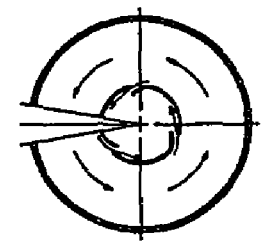
Section C-C
FIG. 6C
Section B-B
FIG. 6B
Section A-A
FIG. 6A

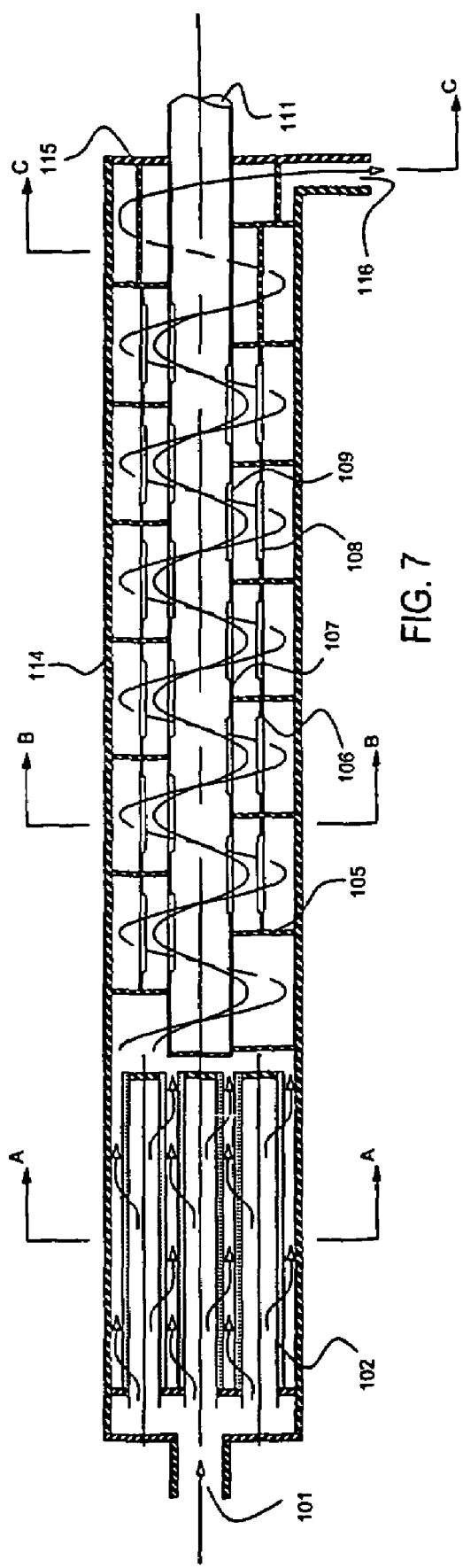
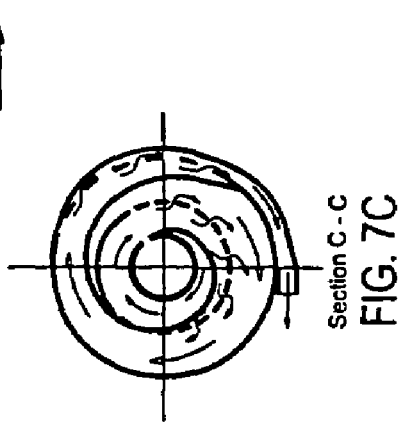
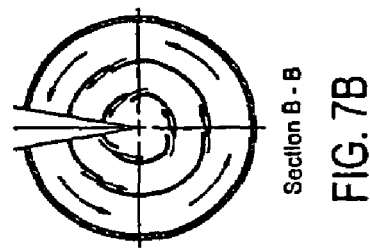
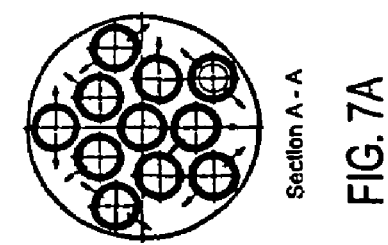
FIG. 7
Section A - A
FIG. 7A
Section B - B
FIG. 7B
Section C - C
FIG. 7C Window Opening Window Opening

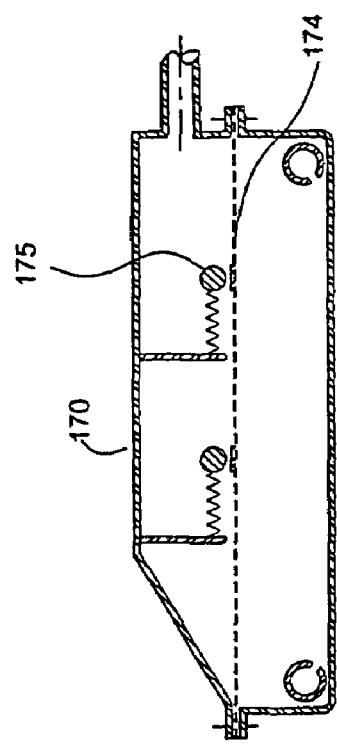
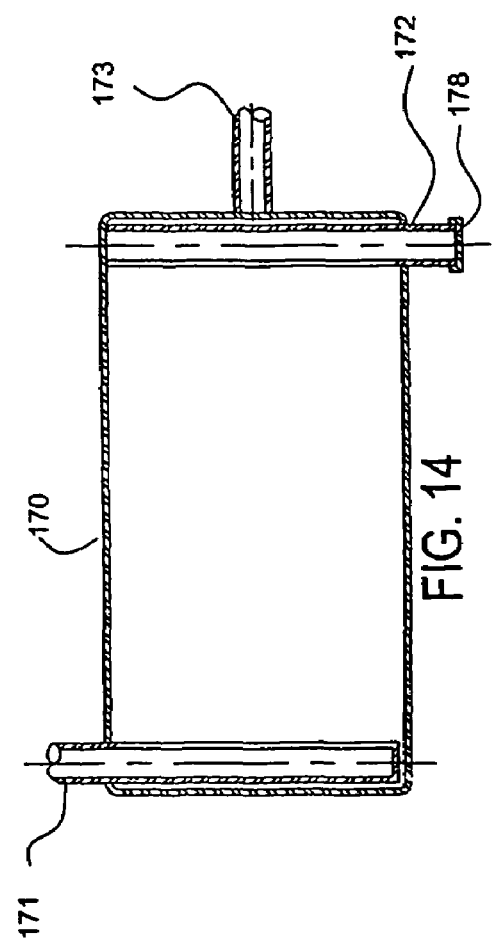

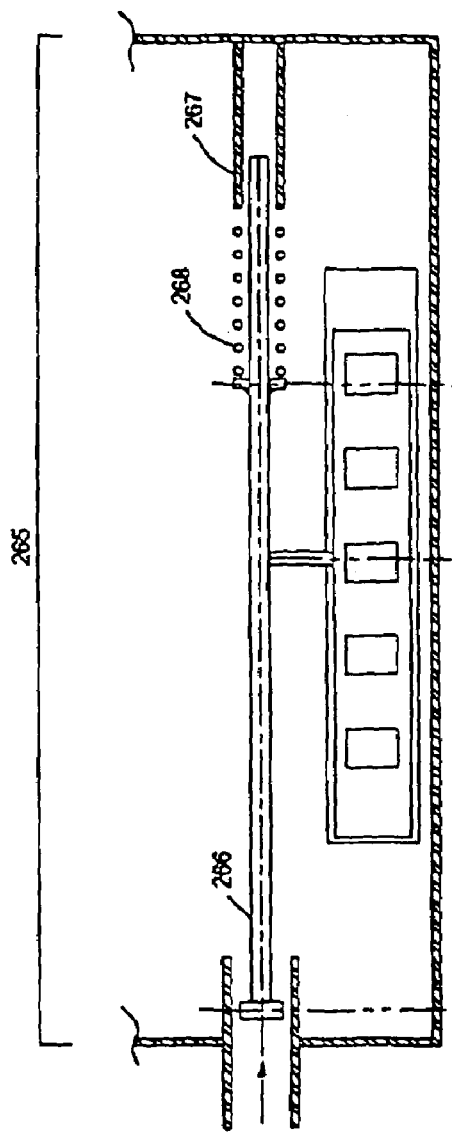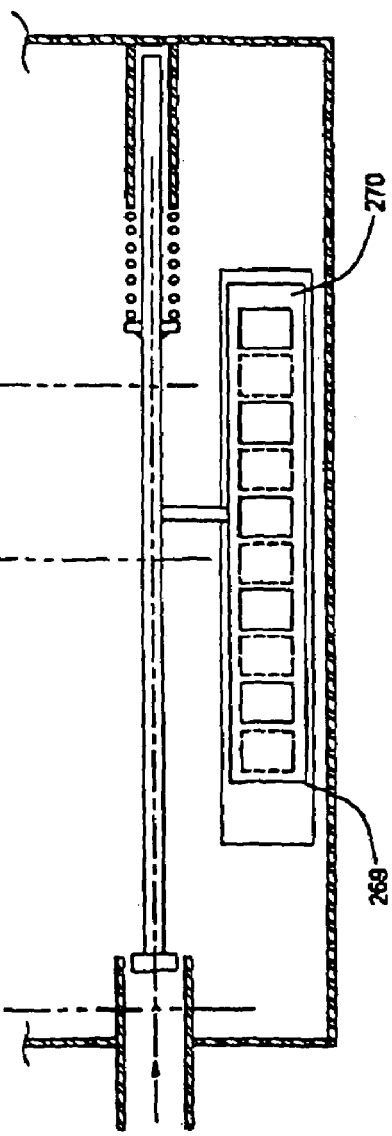
Fig. 23A Open Position
Fig. 23B Closed Position

TYPICAL COLLECTION EFFICIENCY & BACK PRESSURE CHARACTERISTICS

Mechanisms employed for the capturing, disposal and destruction VOC's $SO_2$ and NOX
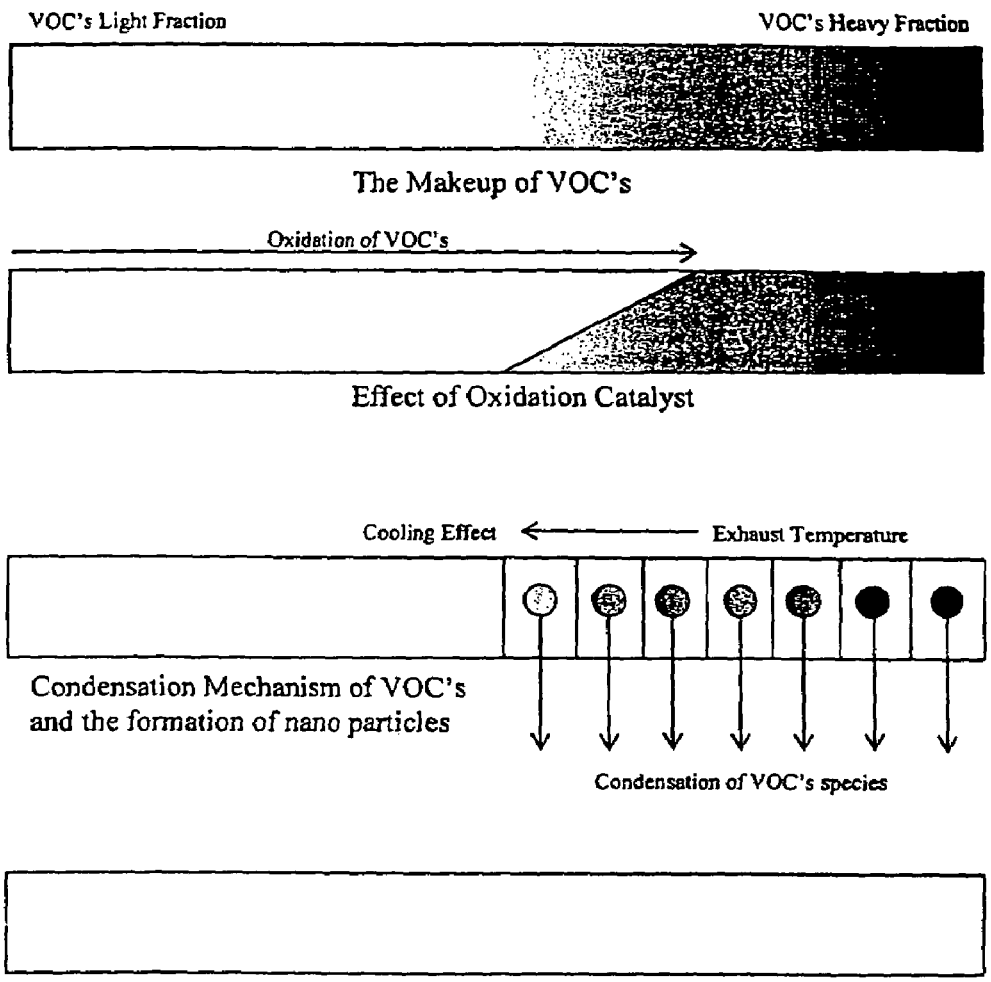
Optimal selection of oxidation catalysts and condensation mechanism on VOC's can produce total elimination of VOC's
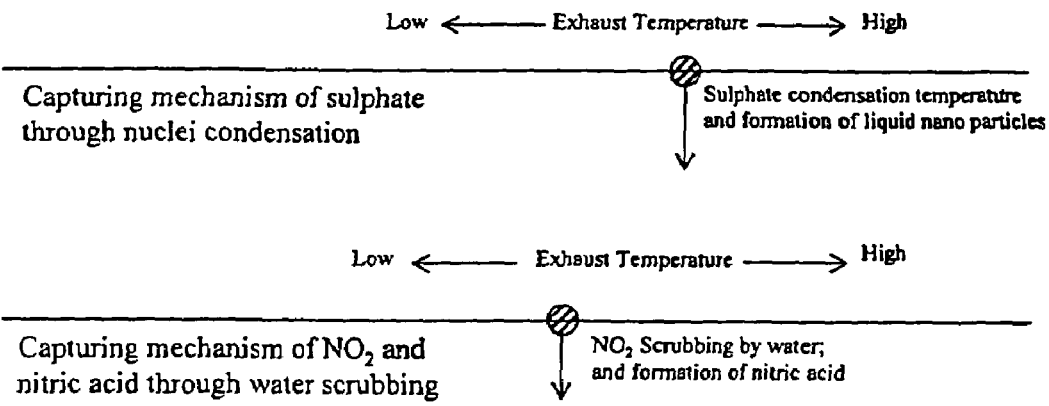
FIG. 28

EXHAUST AFTER-TREATMENT SYSTEM FOR THE REDUCTION OF POLLUTANTS FROM DIESEL ENGINE EXHAUST AND RELATED METHOD

This application is a continuation-in-part of and claims priority to WO 2004/011783 (PCT/US2003/023048) filed Jul. 24, 2003, which claims benefit to U.S. Provisional Application No. 60/398,473 filed on Jul. 25, 2002 and U.S. Provisional Application No. 60/454,046 filed on Mar. 12, 2003.

FIELD OF THE INVENTION

The present invention generally relates to diesel engines. More particularly, the present invention relates to an after-treatment system for the capturing and removal and or destruction of diesel engine exhaust pollutants such as particulate matter, volatile organic compounds (VOCs), nano-particle count, $NO_x$, HC, CO and $SO_2$.

BACKGROUND OF THE INVENTION

Particulate emissions from diesel engines have received considerable attention from governmental regulatory agencies worldwide. Significant research into their health effects has shown that the toxicity impact on human health is much greater than originally perceived. Most of the toxicity of diesel exhaust pollutants is created by VOC compounds and the phenomenon of nano-particle formation and count. Although VOCs and nano-particle count are not regulated yet, measures will be taken to limit their discharge to the atmosphere to the lowest achievable level, which will be the subject of future governmental regulations. Nitrogen oxide is the culprit in the formation of smog and acid rain; sulfur dioxide is a major contributor to acid rain.

Engine technology has drastically advanced over the last ten years. The modern generation of diesel engines is capable of achieving emissions of 0.1 gm/bhp.hr, compared to 0.60 gm/bhp.hr in 1988. Although modern diesel engines are significantly cleaner than older diesel engines, the demand for cleaner exhaust will continue until near-zero emissions are achieved. Currently, USEPA and CARB regulations are targeting particulate emissions down to 0.01 gm/bhp.hr and $NO_x$, emissions down to 0.2 gm/bhp.hr starting with heavy truck vehicles model year 2007. As it stands today it is very difficult, if not impossible, to achieve such target emissions only utilizing engine technology. That leaves the exhaust after-treatment option as a most valid alternative to comply with the regulations.

After-treatment technologies for the capture of diesel particulate-matter and lowering $NO_x$ have received considerable attention over the last twenty-five years. Most of these technologies are focused on capturing particulate matter on filtration media such as cordierite ceramic wall-flow filters, ceramic-fibers wound on perforated tubes, and metallic fiber filter media. Such devices are commonly known as particulate traps.

While particulate traps have proven to be effective filtration media with efficiencies that can reach 80-95%, it is necessary to rid the filter media of accumulated soot to bring it back to the initial conditions for another cycle of filtration. This need has led to the development of what is now well known as the "regeneration process". Although the principles of the regeneration process are simply based on burning the accumulated soot, they are not yet reliable in practical applications. In this regard, regeneration process and particulate traps have severe limitations in real world applications. For example, regeneration must be initiated when filter loading reaches a threshold value beyond which pressure drop across the filter media starts to rapidly increase and would interfere with engine performance operation. From a statistical point of view, the exhaust temperature profiles during diesel truck operation are not sufficiently high to initiate the regeneration process when it is needed. Means were incorporated to facilitate the regeneration process, such as "induced or forced regeneration" in which an external source of heat is employed to raise the temperature of the filter media above the soot ignition temperature to initiate combustion. Alternatively, precious and or base metal catalysts were proposed in the form of a coating on the filter media or as an additive to the diesel fuel. Catalysts can bring the soot ignition temperature down from 620° C. to as low as 320° C., which would enhance the probability of achieving regeneration during engine operation by relying on exhaust temperature profiles, especially at high engine loads. Relying on catalysts to achieve regeneration raised other problems related to catalyst poisoning from sulfur compounds in diesel fuel. This led to the introduction of ultra-low sulfur diesel fuel to ensure durable operability of catalysts. Although the probability of a successful regeneration in real life application has improved over the years, the regeneration problems are not completely eliminated. In the final analysis, complex and expensive hardware having elaborate logics were deployed to work in the harsh exhaust environment, which exacerbated other problems such as reliability and durability in operation.

The most critical limitation associated with the regeneration process in particulate traps relates to reliability in operation, which is a crucial factor, especially in mobile applications. Diesel engine vehicles do not follow a single pattern of driving cycle on the road. Rather, some diesel powered vehicles experience prolonged idling conditions while others operate in congested traffic zones. All these factors render exhaust temperature profiles too low to accomplish regeneration in a passive system. This is true even in the presence of catalysts. As a result, unwarranted problems are created during operation. Although such problems can be typically rectified through "forced regeneration", the associated active components such as fuel injection in the exhaust, valves, microprocessors, thermocouples, and the like have proven to create extensive maintenance and poor reliability in the harsh exhaust environment. Components at or near an exhaust system must be qualified to high shock loading up to 30 g's as well as thermal shock loading. The reliability of active components in diesel exhaust environment has proven to be poor.

Durability is by far another major challenge for particulate trap systems required to achieve durability of 450,000 miles, as well as maintenance-free intervals of 150,000 miles, according to EPA. Most active components and systems lack the ability to meet such durability requirements, due to unwarranted shock loadings, thermal shock stresses, and other related factors.

$NO_x$ control technologies are diversified. Significant control technologies include lean-burn catalysts, plasma-assisted catalysts, adsorbents, selective catalytic reduction, and exhaust gas re-circulations (EGR). Almost all of these known technologies are effective in reducing $NO_x$ emission 25% to 90%. However, each technology has certain problems similar to those associated with particulate traps. By far, exhaust gas re-circulation is the most promising technology having a manageable set of problems. In diesel engines, EGR problems include: (1) contamination of exhaust gas with soot, which creates problems in the air intake system of an engine, (2) high exhaust temperatures interfering with engine performance, and (3) insufficient pressure differential to drive the necessary exhaust flow to the engine air intake to maintain proper circulation. These problems have hampered the acceptance of EGR technology in diesel engine applications. Developments led to the evolution of new EGR concepts for diesel engines, such as high-pressure and low-pressure strategies and combinations thereof. Known EGR systems can be complex and employ extensive hardware that also has the potential for poor durability, poor reliability and high fuel penalty.

In summary, the problems of regeneration and EGR adaptation are still eluding researchers despite improvements. In particular, having soot entrapped in a filter media has proven to be a very difficult and elusive task, without clear resolution warranting acceptance in mobile and stationary diesel applications. A clear need for advancement of the pertinent art exists.

SUMMARY OF THE INVENTION

The present invention relates to the field of particulate trap and replaces current known technologies with a different scheme for the purpose of resolving the foregoing problems. The approach of this invention is based on agglomerating fine soot particles into larger sizes that can be easily separated from the exhaust streams. Two methods can be utilized to achieve separation of agglomerated particles. These are centrifugal separation, and removal of agglomerated soot through reverse pulse jet. The separated particles can be collected and packed into solid pellets and sold as a commodity. Alternatively, the separated particles can be incinerated on a continuous basis in a controlled environment which will eliminate sudden temperature rises and hot spots, thereby achieving high reliability and durability. Application of the teachings of the present invention will provide a simplified and rugged EGR system that resolves the majority of EGR problems in diesel applications. The system lends itself to the control of unregulated emissions at high levels yet to be matched, such as reduction of nano-particle count, total elimination of toxic air contaminant (VOCs), lower pressure drop in the particulate converter, as well as the extraction of NOx and sulfur compounds from diesel exhaust.

The present invention is based on capitalizing on various well-known physical phenomena and properties to clean up diesel exhaust of regulated and unregulated pollutants through a total system approach. Known exhaust particle traps are based on the premise of providing a filtration function. A core product of the present system is the particulate converter. The first approach of the subject invention, which is attractive for stationary engines, is based on replacing the filtration process with an agglomeration process. Having a particulate agglomerator fully loaded with soot will result in full agglomeration of incoming particulate matters i.e., all particulate entering the agglomerator is collected and combined into a larger sized format to be subsequently removed at the downstream end. Once the agglomerator is loaded with soot particles, the incoming particle capturing efficiency is drastically increased and is even higher for finer particle sizes. This leads to the highest known nano-size particle capturing efficiency. Particles blown off at the downstream side of the agglomerator are broken dendrites, and therefore, their size is large. Depending on operating conditions and whether the dendrites are dry or wet, dendrite particle sizes range from 1 to 100 microns while incoming particles range from nano-size to 1 micron and average 0.1 microns. Having particle sizes in the range of 1 to 100 microns creates a new opportunity to separate them and ultimately dispose of them through incineration or simple collection. In either case, the regeneration process, as we know it today is completely substituted with more reliable alternatives. Separated particles, compressed to form soot pellets, are a more effective and reliable approach compared to known filtration technologies. The incineration process also is passive in nature, continuous, and as such is very reliable, durable and it resolves known problems associated with the regeneration process.

Replacing the regeneration process with an agglomeration and separation process creates new opportunities in pollutant reductions. For example, lowering the exhaust temperatures as low as possible, which is the opposite direction compared to known particulate trap strategies, provides a multitude of benefits in emission reductions not previously attainable. By way of example, but not limitation, the benefits include: (1) lowering of exhaust temperature reduces exhaust flow velocity and viscosity resulting in a reduction in pressure drop by a factor as high as 3.1; (2) lower exhaust temperature forces the condensation of heavy VOC fractions into nano-size particles that can be captured at very high efficiencies and eliminated from the tail pipe; (3) lowering the exhaust temperature forces condensation and capture of a higher number of nano-size particles in the particulate converter, instead of taking place after the tail pipe; (4) introducing a platinum catalyst instead of a diesel oxidation catalyst can oxidize $SO_2$ into sulfate nano-particles which can be collected along with soot particles, eliminating sulfur compound discharges from the tail pipe; (5) such active platinum catalyst also oxidizes 50-70% of NO to $NO_2$. Should the exhaust gases be cooled to 200° F. or lower, the bulk of $NO_2$ can be adsorbed with water, thereby resulting in a significant and simple means to reduce $NO_x$ emissions; (6) the performance of the particulate converter is independent of exhaust temperature profiles, which is not the case with other known technologies. These and additional benefits will become apparent to those skilled in the art upon reviewing the details of this invention as set forth below.

Having the particulate agglomeration and separation converter as the cornerstone of the present invention, other additions and enhancements evolved into a system design targeting all known pollutants emitted in diesel exhaust. In mobile applications, the incinerated exhaust by-products are cleaned of particulate matter and, therefore, can be re-directed to the engine air intake as clean exhaust for exhaust gas re-circulation (EGR). EGR provides the function of reducing $NO_x$. Exhaust gas recirculation flow can be further modulated through a diverter valve at the tail pipe.

In the case where the exhaust flow is directed to a settlement chamber instead of the incinerator, the chamber collects soot during engine operation until it is full, which typically takes place over a 3-6 month period. When the chamber is full, it is unloaded during a routine maintenance procedure such as oil change. In the maintenance garage, particulates are evacuated to a soot drum, and processed into compressed pellets. This can be accomplished by plugging the exhaust tail pipe and allow exhaust flow at idle to sweep the accumulated soot (scavenger flow) to a soot drum. The process of emptying a chamber into the soot drum takes about 5 minutes. A single soot drum can serve a number of mobile engines ranging from 10 to several hundred. In stationary applications, marine applications or multiple engine applications, and where space warrants installation of a soot drum, the scavenger flow is processed directly to the soot drum without the need for a soot chamber. Alternatively, the settlement chamber can be replaced with a bag that collects soot.

The system of this invention can provide reductions of PM, $NO_x$, toxicity (VOCs), nano-particle count, $SO_2$, HC and CO at high efficiencies. Further, the simple and passive nature of the particulate converter as well as the majority of the balance of the system is a most promising approach to resolve durability, reliability as well as other safety concerns associated with known after-treatment technologies.

Another embodiment of this invention is attractive for small diesel engine applications such as on trucks and SUVs. In almost all of these applications, the size of the after-treatment hardware is critical, especially in mobile application retrofit. Further, engines operating in transient modes, do not allow the centrifugal separator to function properly at optimum conditions due to added turbulence, swirl effects as well as changes in centrifugal acceleration in the centrifugal separator. This embodiment consists of one single piece of hardware without centrifugal separator. The agglomeration process is substituted with a quasi agglomeration-filtration process. The hardware incorporates a composite wire mesh employing wire mesh media augmented with filtration screens. The quasi agglomeration-filtration media is a deep filter that works on agglomeration principals followed by filtration in a single or multiple stage. The media is not intended to function as a full agglomerator. As such, as the particulate collection efficiency begins to erode (measured by increase in pressure drop across the media), means have to be employed to purge the media. This led to the adoption of a reverse pulse jet to dislodge the bulk of soot stored in the media. The agglomerated blown-off soot on the upstream side settles on the bottom of the housing. To prevent the agglomerated soot from being stirred up and reloading the wire mesh media again, a perforated sheet may be employed to separate the collected soot which drops below the perforated sheet due to gravity and vibration to become separated from the main exhaust stream. The spacing between the perforated sheet and composite wire mesh is dedicated entirely for the flow of the main exhaust stream.

The quasi agglomeration-filtration media embodiment can be, but is not limited to, rectangular in shape having a height suitable for under-the-floor installation on mobile sources such as trucks and buses. Alternatively, this embodiment can take the form of a cylindrical device which can also be suitable for vertical installation on certain trucks and buses. In each embodiment, the number of chambers housing the wire mesh media could be one, two or more. Increasing the number of chambers housing the wire mesh can reduce the pressure drop, increase soot retention capacity and increase soot capturing efficiency.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a longitudinal cross-sectional view of the present particulate converter having a single agglomeration tube showing intake, agglomeration and separation, and outlet.

FIG. 3A is a cross-sectional view taken along the line A-A of FIG. 3.

FIG. 3B is a cross-sectional view taken along the line B-B of FIG. 3.

FIG. 3C is a cross-sectional view taken along the line C-C of FIG. 3.

FIG. 4 is a longitudinal cross-sectional view of the present particulate converter having a two-stage separator and an incinerator integrated within the cylinder body.

FIG. 4A is a cross-sectional view taken along the line A-A of FIG. 4.

FIG. 4B is a cross-sectional view taken along the line B-B of FIG. 4.

FIG. 4C is a cross-sectional view taken along the line C-C of FIG. 4.

FIG. 6 is a longitudinal cross-sectional view of a particulate converter having multiple agglomeration tubes.

FIG. 6A is a cross-sectional view taken along the line A-A of FIG. 6.

FIG. 6B is a cross-sectional view taken along the line B-B of FIG. 6.

FIG. 6C is a cross-sectional view taken along the line C-C of FIG. 6.

FIG. 7 is a longitudinal cross-sectional view of a particulate converter having multiple agglomeration tubes and two-stage particle separator.

FIG. 7A is a cross-sectional view taken along the line A-A of FIG. 7.

FIG. 7B is a cross-sectional view taken along the line B-B of FIG. 7.

FIG. 7C is a cross-sectional view taken along the line C-C of FIG. 7.

FIG. 13 is a plan view of the soot collection chamber.

FIG. 14 is a cross-sectional view of the soot collection chamber.

FIGS. 23A and 23B show the sliding door mechanism in the open and closed position, respectively.

FIG. 28 is a logic diagram illustrating the principles employed for the capturing, disposal and destruction of VOCs, $SO_2$ and $NO_x$.

DETAILED DESCRIPTION

The following description of the embodiment(s) is merely exemplary in nature and is in no way intended to limit the invention, its application, or uses.

A. Brief System Description

Figure 1:
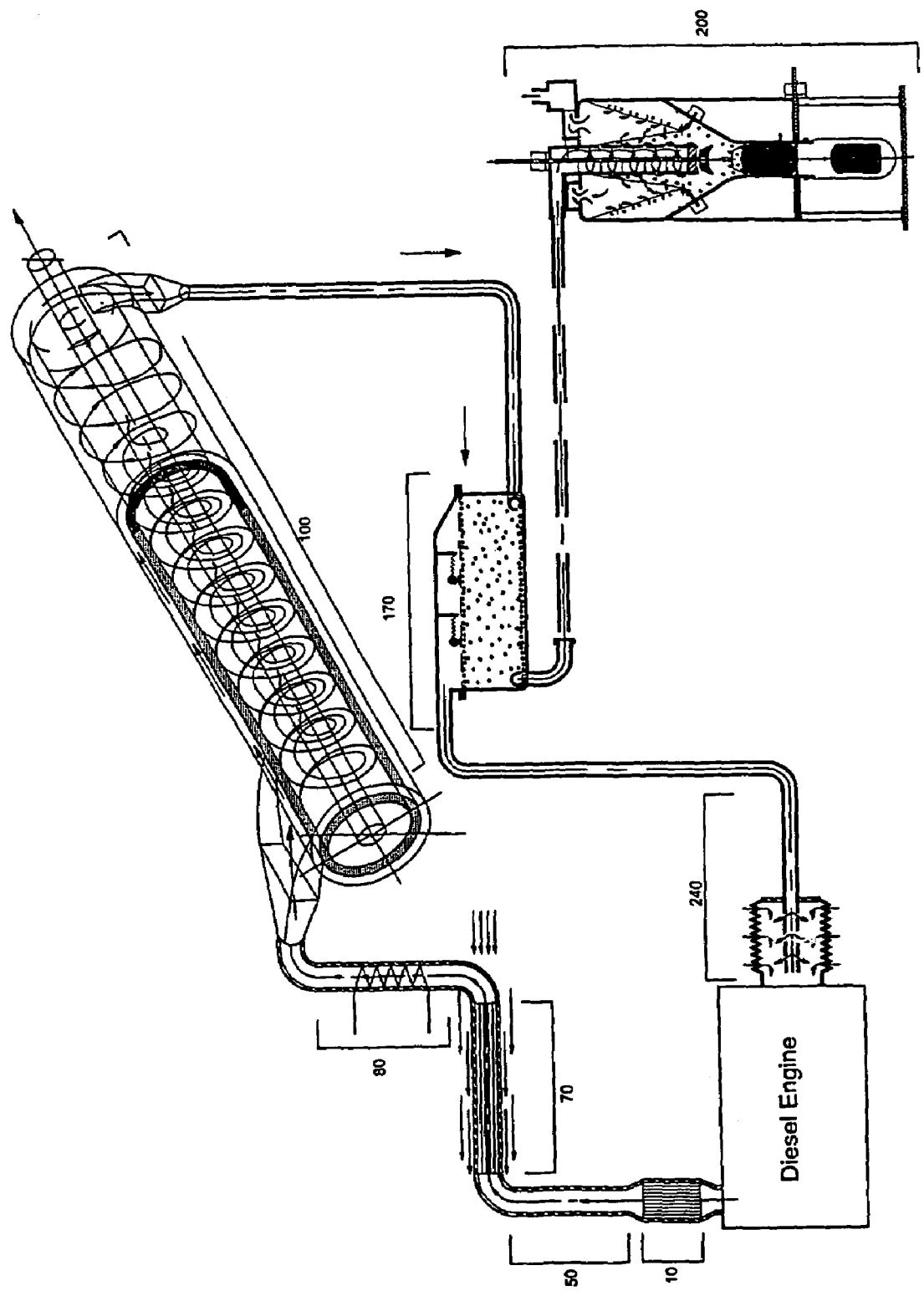
FIG. 1 is a schematic view of a completely passive particulate converter system for stationary applications, illustrating exhaust flow according to the teachings of the present invention.

Referring initially to FIG. 1 of the drawings, wherein reference numerals designate identical or corresponding parts throughout the several views, an after-treatment system for the reduction of pollutants from engine exhaust is illustrated. The system shown in FIG. 1 can be utilized for the after-treatment of exhaust gases from a variety of internal combustion engines operating at lean conditions and having appreciable amounts of particulate matter such as diesel engines, compressed and liquid natural gas engines. The system of the present invention can be designed to collectively destroy/separate/remove all pollutants from the exhaust gases. This includes: particulate matter and nano-size particles, volatile organic compounds, nitrogen oxide, hydrocarbon, carbon monoxide as well as sulfur dioxide. Through combined processing, the exhaust gases released in the atmosphere can be stripped of all the stated pollutants at high efficiencies that can render such high polluting engines environmentally very clean.

With continued reference to FIG. 1 and additional reference to FIGS. 2-7, illustrated are various embodiments of the converter system of the present invention for stationary diesel engine applications. An oxidation catalyst 10 is connected to an engine exhaust manifold. The catalyst 10 can be either a diesel oxidation catalyst or active precious metal catalyst (as in gasoline engine applications). Following the catalyst 10 is the exhaust system 50 designed to have maximum possible cooling of the exhaust gases before entering the particulate converter 100. The possible cooling modes can be generally divided into three segments representing different modes of heat transfer: a radiation segment 60, followed by an air convection segment 70, followed by a liquid convection segment 80.

Figures 5A, 5B:
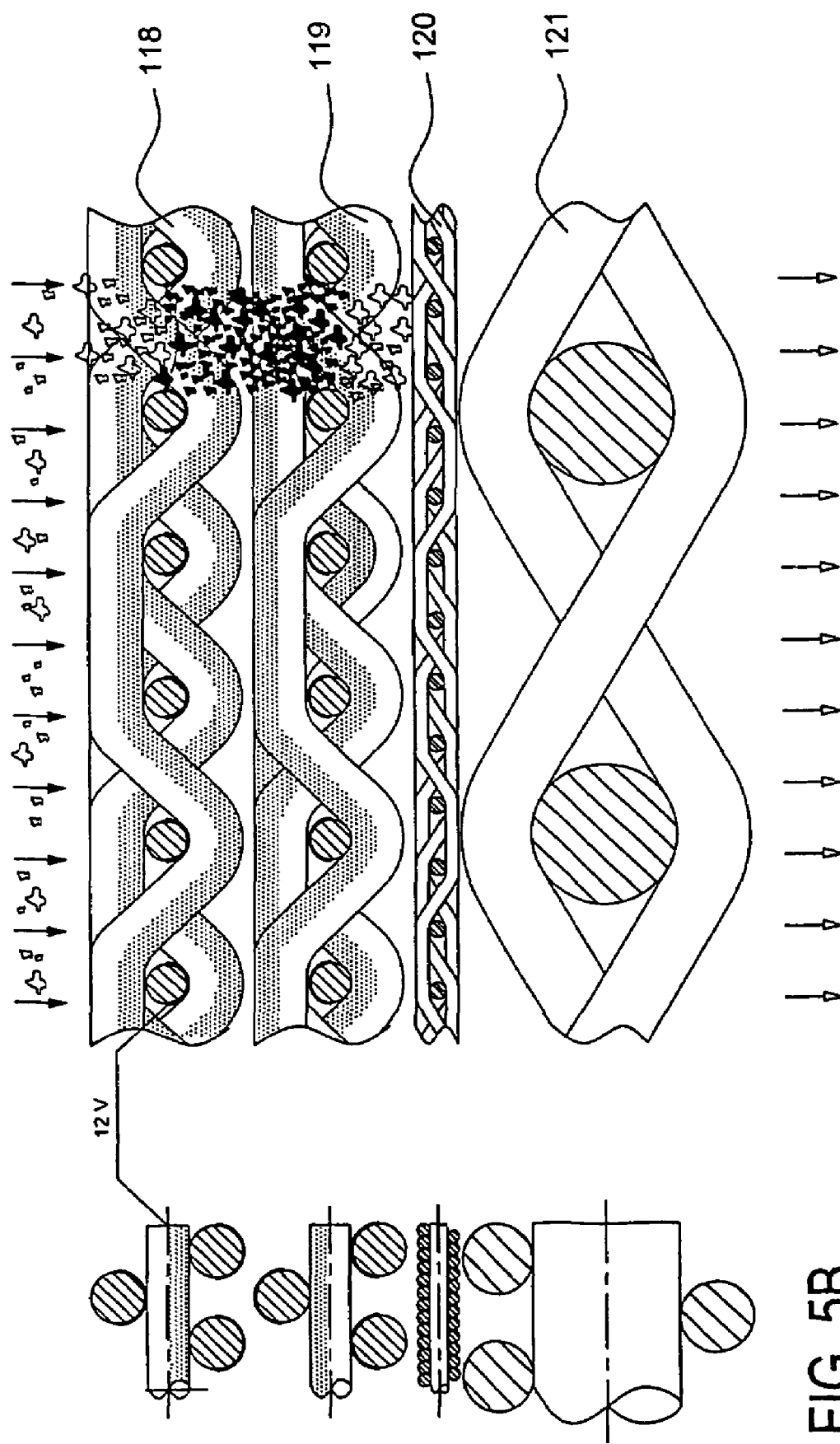
FIGS. 5A and 5B show detailed cross-sectional views of the integrated incinerator knitted screen elements and the incineration process in progress.
Figure 8:
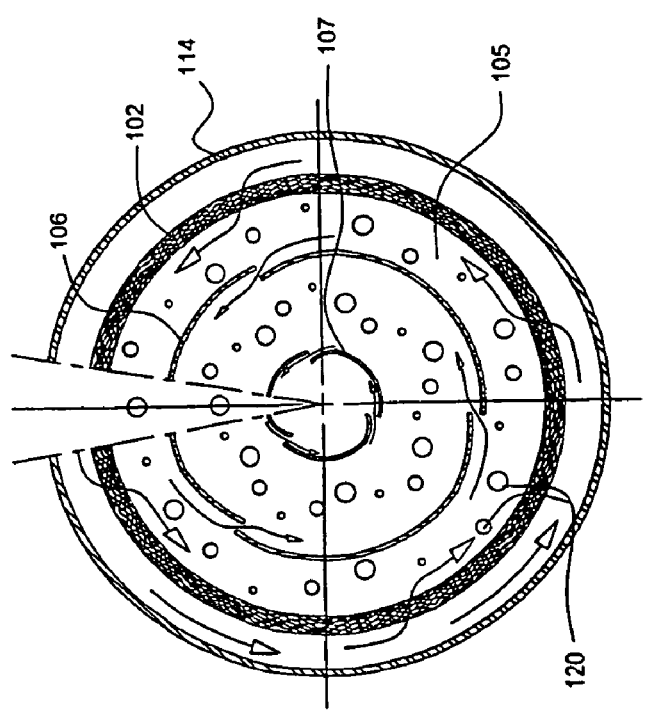
FIG. 8 is a side view of an auger in the particle separator having multiple by-pass openings for noise attenuation.
Figure 9:
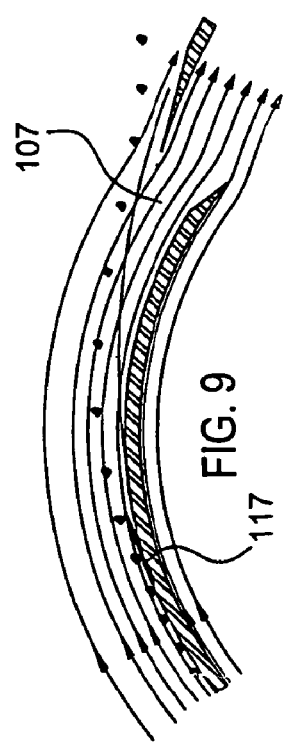
FIG. 9 is a cross-sectional view illustrating the window design and the principle of fugitive particle ejection and separation.

The particulate converter for stationary applications is shown in more detail in FIGS. 3, 4, and 6. The particulate converter primarily consists of an intake section 110, an agglomerator 120, a centrifugal separator 130 and the outlet section 140. The outlet section 140 may employ an incinerator 150 as shown in FIGS. 4 and 5A. and 5B. The scavenger flow channel at the end of the converter is piped out to a soot collection chamber 170. The clean exhaust leaving the soot collection chamber 170 forms an exhaust gas re-circulation (EGR) 200 to the air cleaner of the engine. The EGR system may employ an axial boost pump 241 for proper metering of EGR flow. The soot collected in the soot collection chamber 170 is piped out to soot processing drum 200 to reclaim soot in the form of pellets.

B. Oxidation Catalyst

Oxidation catalyst 10 of the present invention is selected to have sufficient reduction of the light fraction of the VOC compounds but to allow the heavy fraction of VOCs to pass through, condensate in the exhaust pipe and ultimately be collected in the particulate converter. The condensed fraction of the VOCs functions as a bonding material that produces agglomerated particulates having large sizes and prevents breakdown due to turbulence or swirl phenomenon encountered in the cyclonic separator. Therefore, a smaller-size diesel oxidation catalyst is adequate for the purpose of the present invention. A diesel oxidization catalyst also is effective in oxidizing hydrocarbon, carbon monoxide and has a minor effect on the oxidization of sulfur dioxide ($SO_2$). On the other hand, an active precious-metal catalyst is highly effective in oxidizing hydrocarbon, carbon monoxide, and the light fraction of VOCs as well as the oxidization of $SO_2$ into sulfate compounds and NO to $NO_2$ at high efficiencies. Oxidation of $SO_2$ into sulfate is known industry-wide to be a very undesirable catalytic activity in diesel exhaust application since it results in an increased particulate emission. On the other hand, if the exhaust gas temperature after the catalyst is cooled below sulfate condensation temperatures, nano-size sulfate particles are formed which can be collected along with soot particles in the converter. The mixture of soot and sulfate forms wet brownish particles. Where sufficient cooling can be achieved, this methodology can rid the exhaust gases of $SO_2$ pollution at high efficiencies. It should also be noted that NO can be oxidized to $NO_2$ at efficiencies in the range of approximately 50-70%. Since $NO_2$ is reactive, it can be absorbed along with sulfate compounds through scrubbing the exhaust with water after the converter.

C. Exhaust Cooling System

Devising means to cool exhaust gases varies according to engine application and the availability of liquid cooling media such as water. The approach of this invention is based on capitalizing on the properties of heat transfer modes. As the exhaust gases leave the oxidization catalyst 10 at high temperatures, radiation exhaust section 60 is utilized. The radiation section 60 is characterized by having large surface area or larger pipe, and surface finish having the highest radiation characteristics such as matte black. This can be followed by an air/exhaust heat exchanger section 70. This section 70 relies on the relative speed of outside air passing across the exhaust pipe, due to vehicle movement. The exhaust pipe can be corrugated in the axial direction to expand the surface areas. Multiple pipes can also be used. All pipes should be exposed to the wind factor.

The last section is the liquid/exhaust heat exchanger 80. This section 80 relies on using liquids such as engine coolants, commonly used in automotives, or water, to provide the necessary cooling. It should be noticed that the exhaust temperatures of most diesel engines could reach approximately 900°-100° F. at full load. Target exhaust temperature at the inlet to the converter is approximately 250° F. to 300° F. Where abundant cooling is available, such as water, and $NO_2$ needs to be scrubbed, exhaust temperatures need to be lowered even further, to approximately 150° F. to 200° F. range after the converter. The selection of the three different cooling mechanisms varies to a great degree from one engine application to the other. Generally, the radiation section 60, by far, provides the highest cooling effect and is the least expensive. The second or third cooling mechanism can be used together or individually, dependent on the application.

D. Particulate Converter, Full Agglomeration

FIGS. 3, 4, 6, and 7 further illustrate a particular embodiment of the particulate converter 100. The intake segment 101 of the converter 100 diverts the incoming flow from a round or rectangular piping into the spacing between the housing 113 and the agglomerator 102 by gradually expanding the flow channel into the space feeding the agglomerator to minimize pressure drops.

The agglomerator section 102 in the converter 100 can be either a single shell as shown in FIGS. 3 and 4, or a multiple tube design as shown in FIGS. 6 and 7. In both embodiments, a large surface area enhances the agglomeration efficiency. In the multiple tube design of FIGS. 6 and 7, all flow is directed to the centrifugal separator. In the single shell agglomerator of FIGS. 3 and 4, the flow is fed and processed on a continuous basis to the centrifugal separator. The amount of flow processed in each channel, therefore, is a fraction of the total flow.

Dependent on the travel path of the exhaust flow from the agglomerator to the inside pipe 104 and the length of the agglomerator, the amount of the flow in the channel can be selected. Processing a fraction of the total flow per channel is desirable since turbulence and swirl effects can be reduced. Further, the process of particulate separation through centrifugal action is limited to retain the particulates separated at the inside diameter of the agglomerator, while the clean exhaust stream migrates inwardly toward the inside core tube 107.

Figure 10:
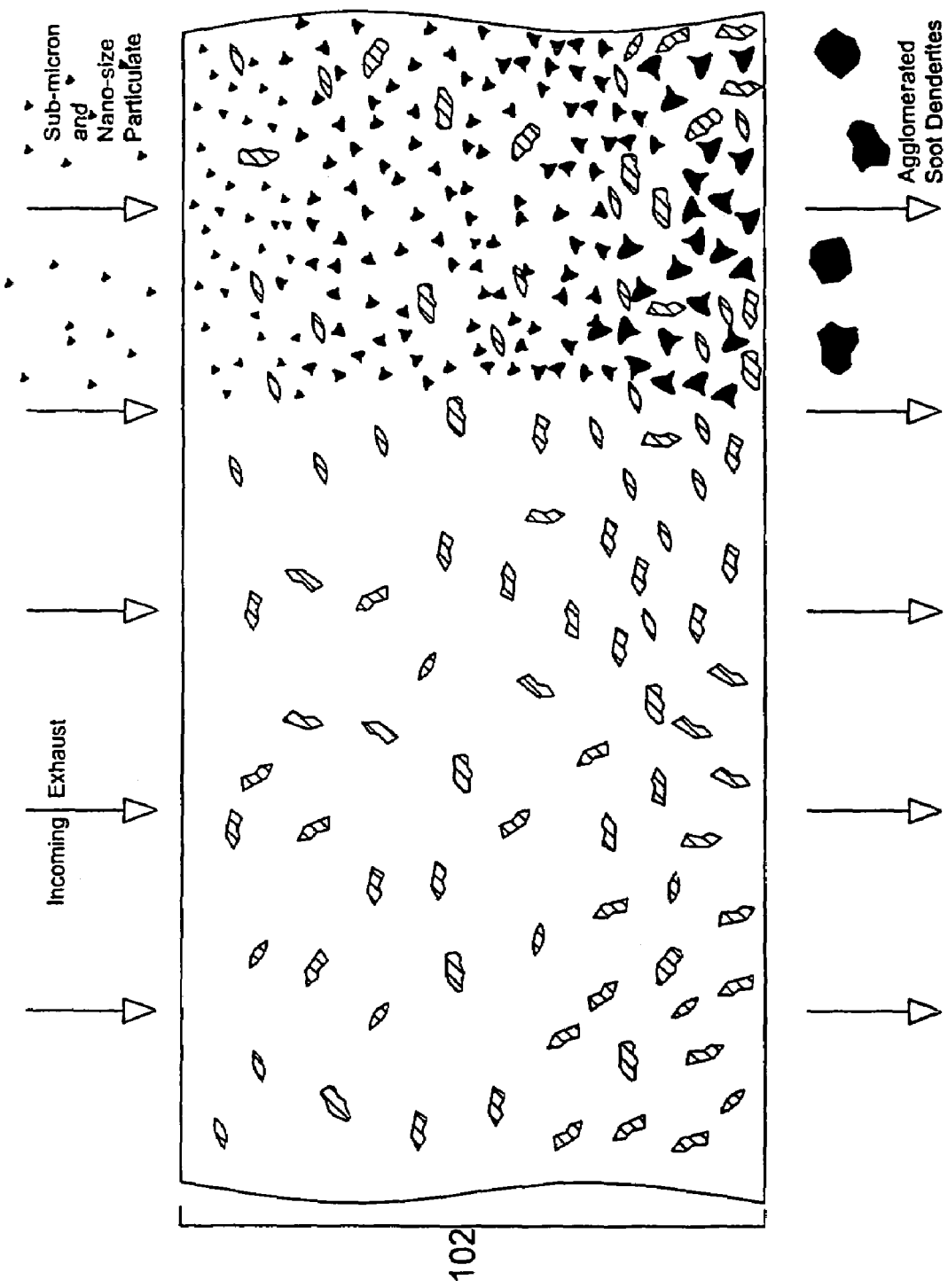
FIG. 10 is a cross-sectional view of a composite wire mesh agglomerator.
Figures 24A, 24B:
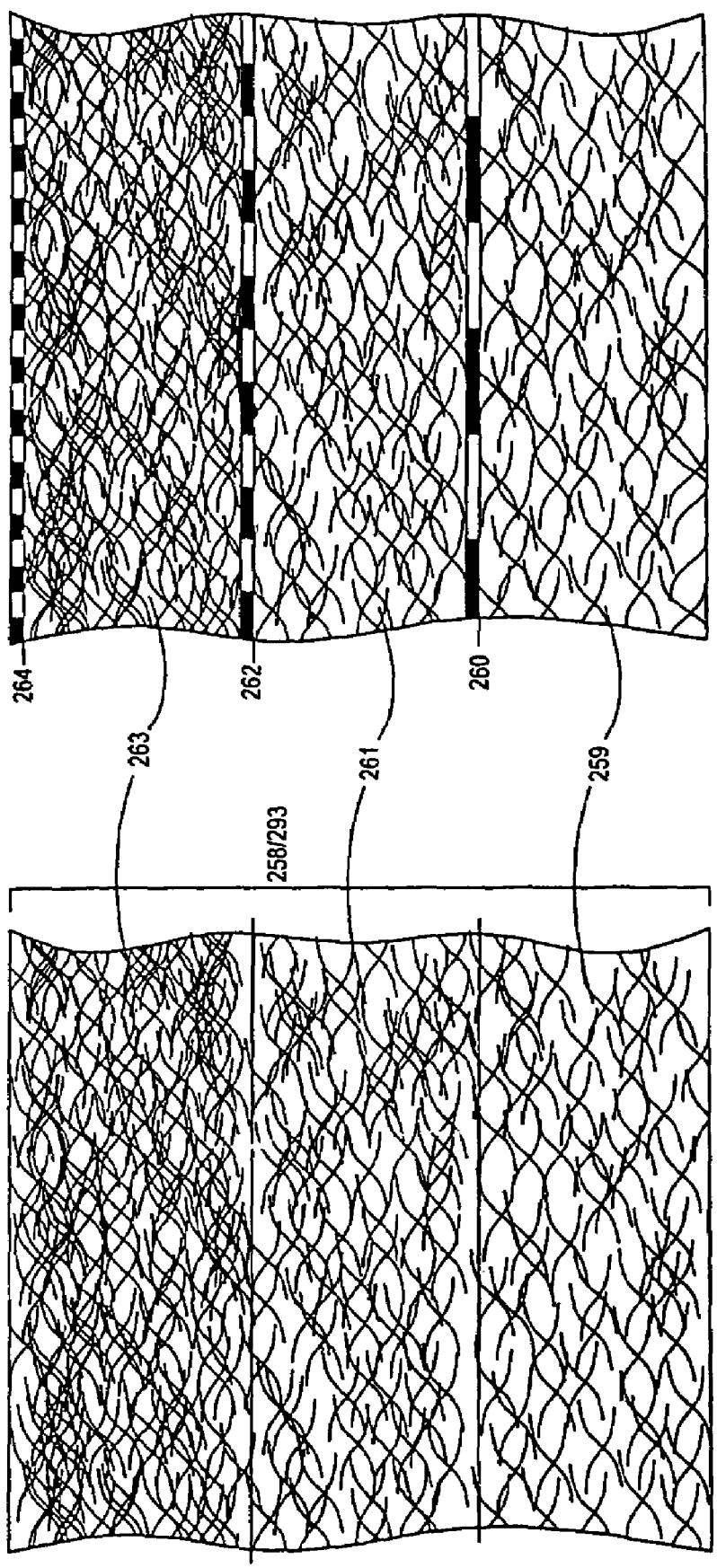
FIGS. 24A and 24B are cross-sectional views of an agglomeration-filtration composite wire mesh media, and quasi fibrous and screen filtration media.

The agglomerator is constructed from composite wire mesh media having variable wire sizes having packing densities as particularly shown in FIG. 24A. The upstream side of the agglomerator 102 is made of coarse wire having low-packing density and progresses to finer wire having higher packing densities at the downstream side as shown in FIG. 10. Such selection criterion allows the capturing of large particulates on the outside layers while the smaller-size particulates are captured on the finer more packed wire. This strategy allows for maximum particle capturing efficiency and even soot loading distribution across the media while maintaining the pressure drop as low as possible. Further, having open pores on the upstream side of the agglomerator allows the particles to be captured inside the agglomerator and prevents the build up of soot layers (cake) ahead of the agglomerator which could result in increasing the pressure drop. The process of agglomerating particulate matter is illustrated in FIG. 10.

The thickness of the agglomerator may range from approximately 10 mm to approximately 30 mm and may average approximately 10 mm to 20 mm in most applications. This thickness, along with the build-up of soot dendrites in the void space between the wires, combined with low flow velocity, can result in the highest efficiencies of capturing sub-micron and nano-size particles from diesel exhaust having an order of reduction ranging from $10^4$ to $10^5$ of particle count. This drastically reduces a key component of exhaust toxic pollutant.

The agglomerator of the present invention drastically contrasts with other known soot filter technologies, such as the ceramic wall-flow monolith where such devices have wall thickness averaging 0.1 mm to 0.3 mm, rendering them less efficient in capturing sub-micron and nano-size particles. The nano-particles capturing efficiency is further enhanced through cooling of the exhaust gases. Substantial amounts of nano-particles are formed during the cooling process of exhaust gases, and the maximum formation is reached when exhaust gases are cooled to ambient temperature. Cooling the exhaust gases from the 900°-1000° F. range to approximately 250°-300° F. will result in forcing the condensation of a large numbers of nano-particles ahead of the converter. It is believed that the light fraction of VOC compounds responsible from further formation of the remaining nano-particle count is destroyed mostly through the oxidization catalyst. The combined effects of oxidation catalyst, exhaust cooling and the agglomerator of this invention provides the highest reduction of nano-size particle count industry-wide before the exhaust leaves the tail pipe.

E. Centrifugal Separator

The centrifugal separators of the various embodiments of the present invention are shown in FIGS. 3, 4, and 7. The centrifugal separator 99 of FIG. 3 is constructed from one helical auger 105 mounted on concentric core (pipe) 111. Exhaust from the agglomerator is fed on a continuous and uniform basis throughout the length of the centrifugal separator. The concentric core pipe is equipped with windows 109 spaced equally along the flow path. The windows are spaced at about 120° apart along the auger rotational direction. To initiate rotational flow pattern, no windows are employed at the inlet to the auger. A cohersion baffle plate 103 is introduced which gradually builds up the flow into spiral motion. As the flow in the channel builds up, the cohersion plate gradually moves in the radial direction towards the inside core pipe. As such, the cohersion plate starts at the outside diameter and moves spirally toward the inside core. About 1.5 turns of auger rotation are needed to establish the full rotational flow channel. No windows are employed in this section of building up the rotational flow channel. The first window is employed 120° past the end of the cohersion plate to allow for particle separation in the exhaust layer adjacent to the core pipe. Thereafter, window-design captures clean layers of exhaust flow at a rate corresponding to the rate of incoming flow from the agglomerator. This allows the flow velocity in the flow channels to remain essentially constant. The selection of the startup section of the centrifugal separator and the location of the first window establishes the number of rotational cycles of the exhaust gases before entering the windows. Generally, about two rotational cycles are adequate for the separation of agglomerated particles having an approximate size over two (2) microns. Higher rotational cycles result in cleaner exhaust.

Figure 11:
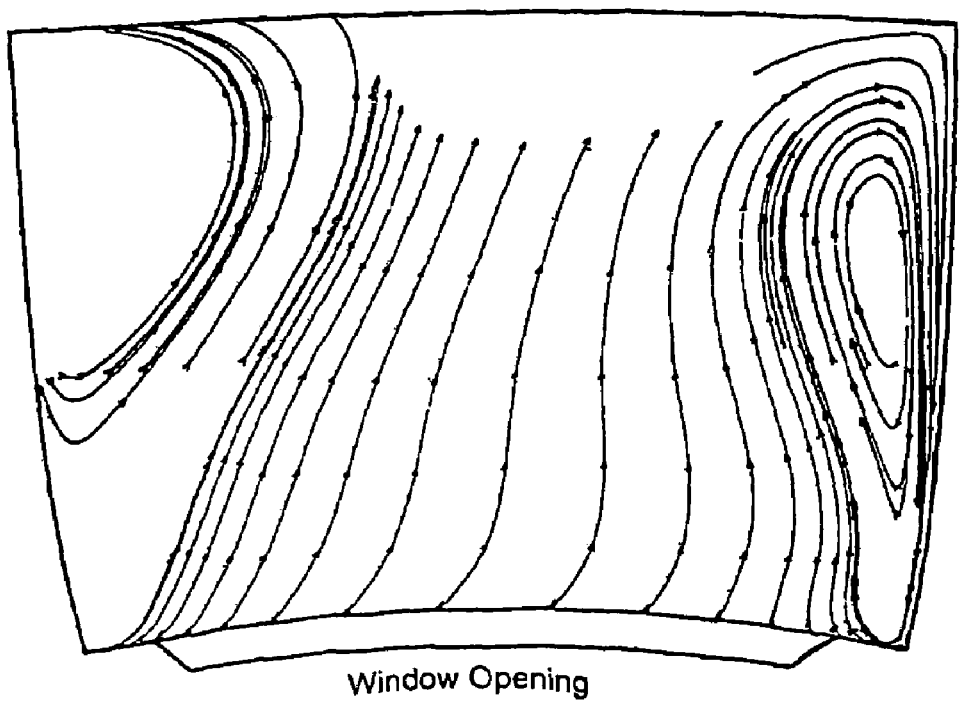
FIG. 11 illustrates the analytical results of 2-micron particle migration as a function of flow travel within the centrifugal separator and the location of window openings, spacing between two consecutive arrow heads corresponds to migration resulting from a fall cyclonic rotational turn (360°). The plot has been generated from a 3-dimensional fluid-mechanical analysis and highlights particle migration by size and the impact of swirl effect.
Figure 12:
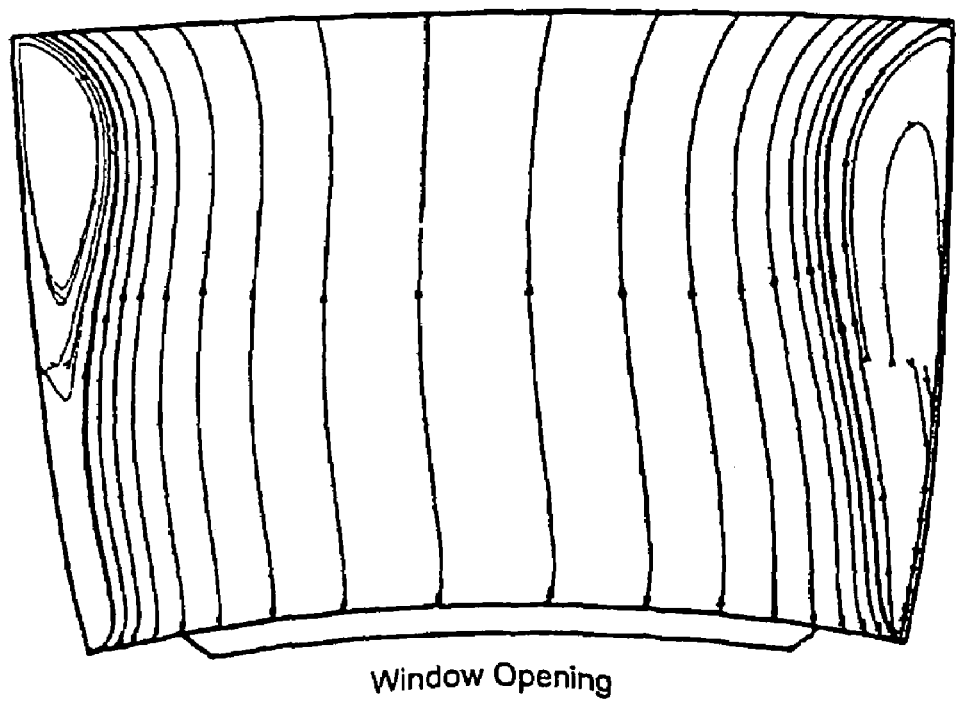
FIG. 12 illustrates the analytical results of 5-micron particle migration within the centrifugal separator and the location of window openings. Spacing between two consecutive arrow heads corresponds to migration resulting from a full cyclonic rotational turn (360°).
Figure 15:
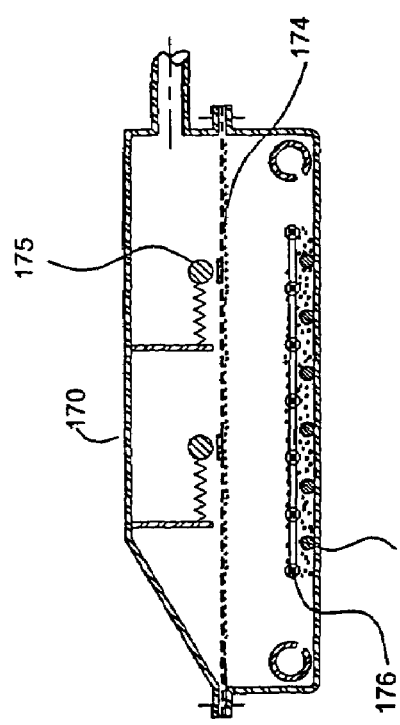
FIG. 15 is a cross-sectional view of the soot collection chamber having an integrated incinerator.
Figure 16:
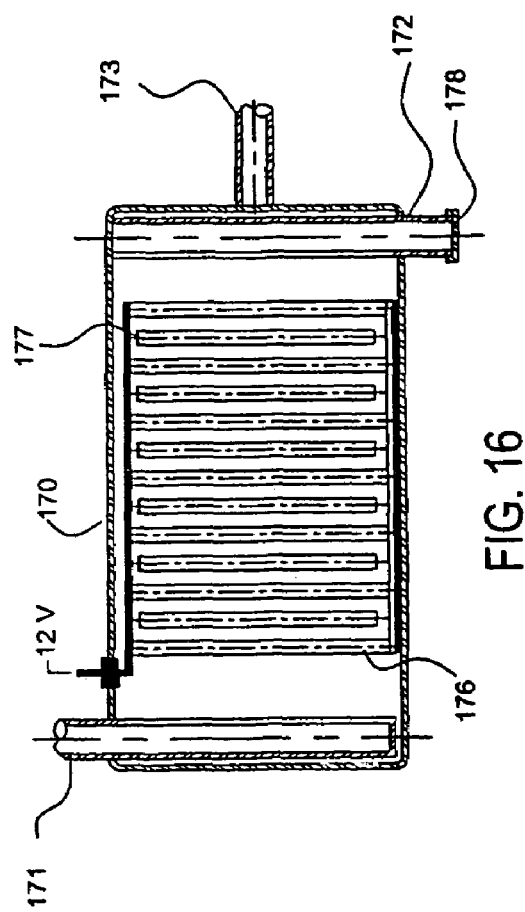
FIG. 16 is a plan view of the soot collection chamber having an integrated incinerator.

FIGS. 11 and 12 illustrate typical particle separation (migration) through the centrifugal separator as a function of particle size vs. rotation. The particle migration for one full cyclonic turn (360° rotation) is represented by the path between two successive arrowheads. It is apparent that larger size particles migrate in the radial direction faster than smaller particles. Two phenomena, however, create adverse effects on particle radial migration in the centrifugal separator: turbulence and swirl effect. Both have been investigated through 3-dimensional fluid-mechanics analysis employing aerosol modeling of particles having different sizes. The effect of swirl is dominant for smaller particles and can result in particle migration in the opposite direction of centrifugal direction, thus defying the targeted separation. However, swirl is limited to localized zones approximated as those adjacent to the two sides of the auger as shown in FIGS. 11 and 12. The window opening, therefore, is selected to stay clear from the swirl zones to avoid re-entering of contaminated exhaust inside the windows.

It has been experimentally observed during testing that smaller size particles that have not been agglomerated fully into approximately 1.0 or more microns, or those that might have broken off into smaller particles due to turbulence or swirl effect, are collected on the outside surface of the core pipe. This observation is contradictory to the effect of centrifugal action. It is hypothesized that such small particles are carried to the core pipe due to the swirl effect and then collected through the diffusion mode of particle collection. Such particles are considered fugitive, agglomerate on the surface of the core pipe, and then begin to migrate in the flow direction once their size reaches a certain threshold to warrant sufficient drag effect in the flow direction. These particles, although they constitute a small fraction of the total particles, can be re-entrained almost entirely into the windows flow, unless certain measures are employed.

A simple particle ejector 117 or separator is installed ahead of the window 107 as shown in FIG. 9. By releasing the agglomerated particles ahead of the window opening, centrifugal action will cause such particles to migrate radially a sufficient radial distance to avoid entering in the space of the window designated for clean flow. Due to particle inertia, these particles will establish a flow path separate from the flow stream entering the window. This phenomenon is referred to as non-isokinetic in aerosol science.

Clean exhaust streams are entering the window openings on a progressive basis. The collected clean exhaust in the core pipe is released to the atmosphere. All agglomerated particles remain separated and are accumulated on a continuous basis at or near the outside diameter of the centrifugal separator. At the downstream end of the centrifugal separator, a portion of the exhaust gases carries all separated particles and are directed to an exit or to an electric incinerator. This portion of exhaust gases is referred to as scavenger flow. Exit mechanism is shown in the sectional views of FIGS. 3C, 6C and 7C. Cohersion spiral plate 112 is used to assist exiting the scavenger flow through outlet 116.

Where an electrical incinerator 117 is employed as an integral component of the particulate converter, as shown in FIG. 4, two tapered conical-shaped screen assemblies are connected at their ends to the inside core 111 and the outside shell 115, while the two mating ends are fastened together. This arrangement allows for high surface area needed to keep exhaust flow velocity low through the composite screen assembly. The scavenger flow is split between the two conical screen assemblies. Surface area can be doubled by doubling the number of the conical screen assemblies (not shown).

F. Incinerator, Embodiment A

The composite screen assembly is shown in FIGS. 24A and 24B. The screens have different functions. The first screen 120 is selected to have large size knitted wires and wide openings. The downstream side of the screen 120 is coated with electrical insulating material such as a ceramic substance. This screen 120 is connected to either 12 or 24-volt power supply. The second screen 121 is identical to the first screen 120 except that an electrical insulation is applied on the face matting with the first screen 120. The third screen 122 is the barrier screen and is selected to have openings less than 50 microns. The fourth screen 123 is a large-wire screen and is selected to provide structural support of the first three screens 120, 121 and 123. The ceramic coating on the matting sides of the first and second screens 120 and 121 provide double protection against short-circuiting of the screen metals.

As the scavenger flow penetrates the screen assembly in the sequential order of this invention, agglomerated soot is collected on the outside surface of screen 122, which functions as a barrier. The soot particles continue to build up soot layers in the upstream direction until it reaches the first screen 120. Soot particles collected on the first and second screens 120 and 121 will come in contact with the bare metal of the two screens 120 and 121. Due to high electrical conductivity of soot, an electrical circuit is established and electric current flows through the soot layer. Soot is heated up to a high temperature in three to six seconds, and with the presence of oxygen in the scavenger flow, soot is incinerated very quickly.

To enhance the process of incineration, the bare metal of the second and third screens 121 and 122 may be coated with platinum. Precious metal coating will drastically improve the incineration process by lowering soot ignition temperature. Further, the presence of platinum coating maintains incineration process at high efficiency despite low oxygen content in the exhaust gases. The by-products of the incineration process are CO, $CO_2$ and steam, all of which are harmless gases and can pass through the third screen 122.

Ash build up could potentially interfere with the function of the incinerator as it gradually builds up in the spacing between the first and second screens 120 and 121. Most ash is shaken off due to vibration and fall to a cavity at the bottom of the incinerator. Remaining ash that could clog the screen assembly can be removed through a periodic maintenance procedure using backpressure pulsation.

The incineration process takes place only on localized areas where soot build up reaches a point when an electrical circuit is formed. This renders the incineration process intermittent and somewhat continuous. Due to the very small flow velocity across the composite screens, high dispersion of soot loading over large area of the screen, small amounts of soot incinerated, thermal inertia of the first and second screens 120 and 121, the incineration process is considered to take place in a controlled environment. No appreciable increase in exhaust temperature would be observed between the upstream and the downstream side of the incinerator. Further, the material selected for the screens 121 and 122 is stainless steel having high corrosion-resistance at high temperature and high chemical-resistance against carbon and sulfur attacks. Selected specialty alloys having high nickel, chromium and aluminum such as a commercial grade known as alpha alloy are very adequate for the screen material.

The scavenger flow leaving the converter employing an incinerator is clean of particulate matter and can be utilized as an exhaust gas re-circulation (EGR), and, therefore, is connected to the engine air intake after the air cleaner filter element. Vacuum pressure after the air cleaner is a sufficient drive to establish scavenger (EGR) flow. Such system arrangement is completely passive. However, EGR flow is small and non-controllable, and the ensuing reduction in $NO_x$ is small, 15-20% range. Further, when the engine is at idle conditions no EGR flow is established due to the very low negative pressure after the air filter element.

G. Soot Collection Chamber

Another embodiment as a substitute for the incinerator employs a soot collection chamber 170 as shown in FIGS. 13 and 14. The soot chamber 170 is a simple chamber having one outlet at the bottom 171 for scavenger flow intake and a second outlet 173 at the upper side for clean exhaust exit. The clean exhaust leaving the chamber becomes exhaust gas re-circulation as described before.

The soot chamber has two compartments separated by screen 174. The screen 174 functions as a soot barrier. Selecting the screen 174 to have a large surface area and having space void less than approximately 50 microns in addition to small scavenger flow results in very small flow velocity across the screen. This renders the screen 174 to function as a barrier to agglomerated soot. Soot builds up on the surface of the screen 174 in the form of layers (cake). As more layers of soot continue to build up on the downside of the screen, these layers ultimately fall down to the bottom of the chamber due to vehicle vibration and shock loadings.

Employing a system having a spring and steel ball vibrating at its own natural frequency can enhance the process of releasing soot layers. The vibrating system is excited through road and engine vibration. The soot chamber can be designed to collect soot-generated from three to six months of a truck operation dependent on engine soot emission level. Soot is collected in the bottom half of the chamber up to the screen. The chamber may employ an incinerator. The soot chamber incinerator consists of two rows of staggered stainless steel tubes coated with platinum, and is located at the bottom. The lower row is grounded and the higher row is connected to 12 or 24 volt power supply. Soot bridging the gap between the grounded tube and the power tube is incinerated on a continuous basis. Incinerators employed in the soot chamber are rugged and have simple design. Incinerator by-products are harmless gases that circulate to the engine air intake as part of the EGR system.

Diesel applications where active platinum oxidation catalysts are employed will oxidize $SO_2$ to sulfate compounds, and soot collection should replace the incineration process. This is simply due to the fact that sulfate compounds cannot be incinerated. Re-circulation of sulfate compounds to the engine as part of the EGR can result in unwarranted damage to the intake system of the engine. This leads to an embodiment in which soot is collected in the soot chamber and then is processed finally in a soot-processing drum 220 into soot pellets for ultimate sale as a commodity know as carbon black. Soot chamber 170 is emptied by connecting the second outlet 178 at the bottom of the chamber 170 to the soot processing drum 220, temporarily plug the tailpipe of the truck and operate the engine at close to idle conditions for about five minute. The engine exhaust flow will sweep the collected soot at the bottom of soot chamber 170 to the soot drum.

H. Soot Processing Drum

Figure 17:
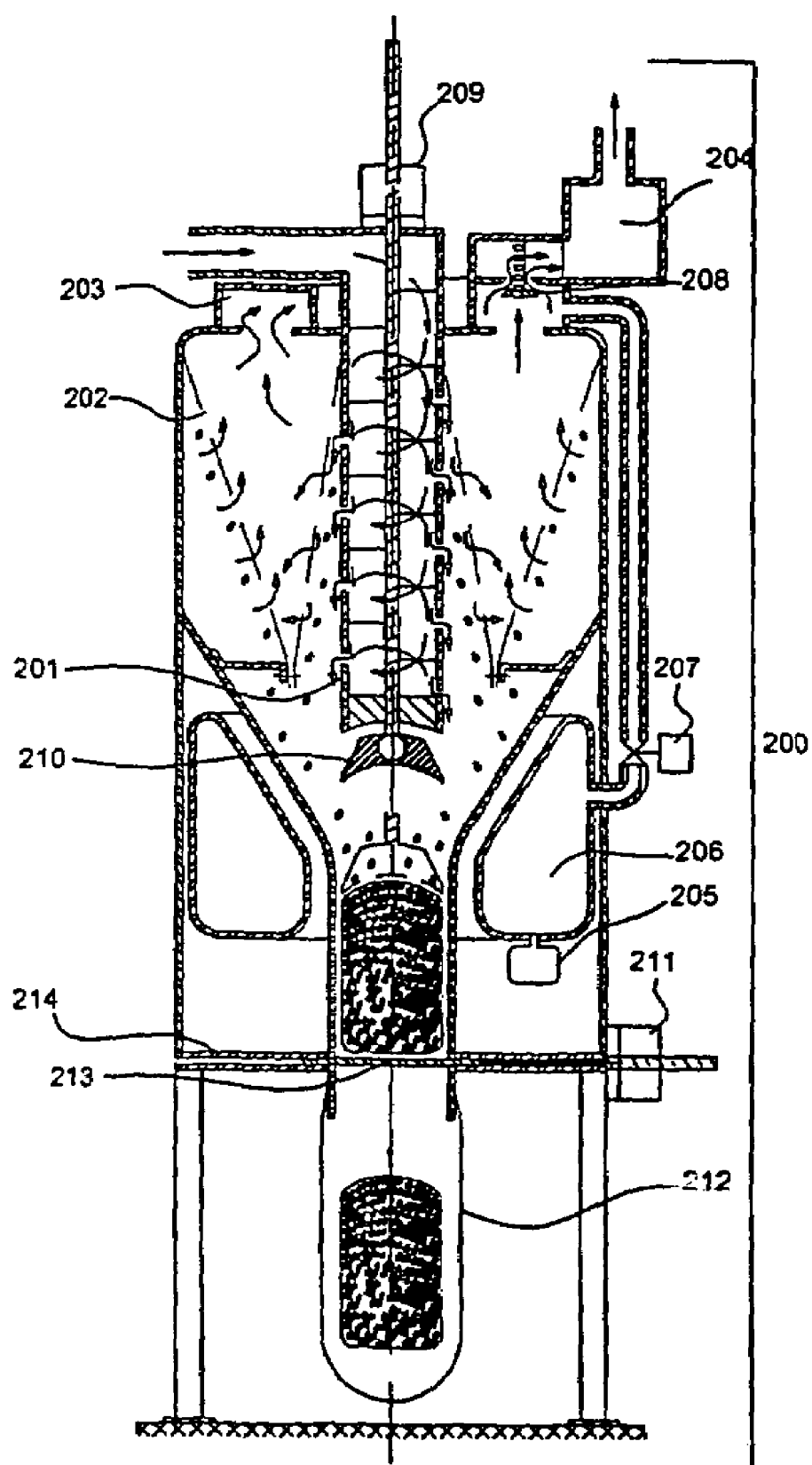
FIG. 17 is a longitudinal cross-sectional view of soot processing drum with reverse pulse-jet.
Figure 18:
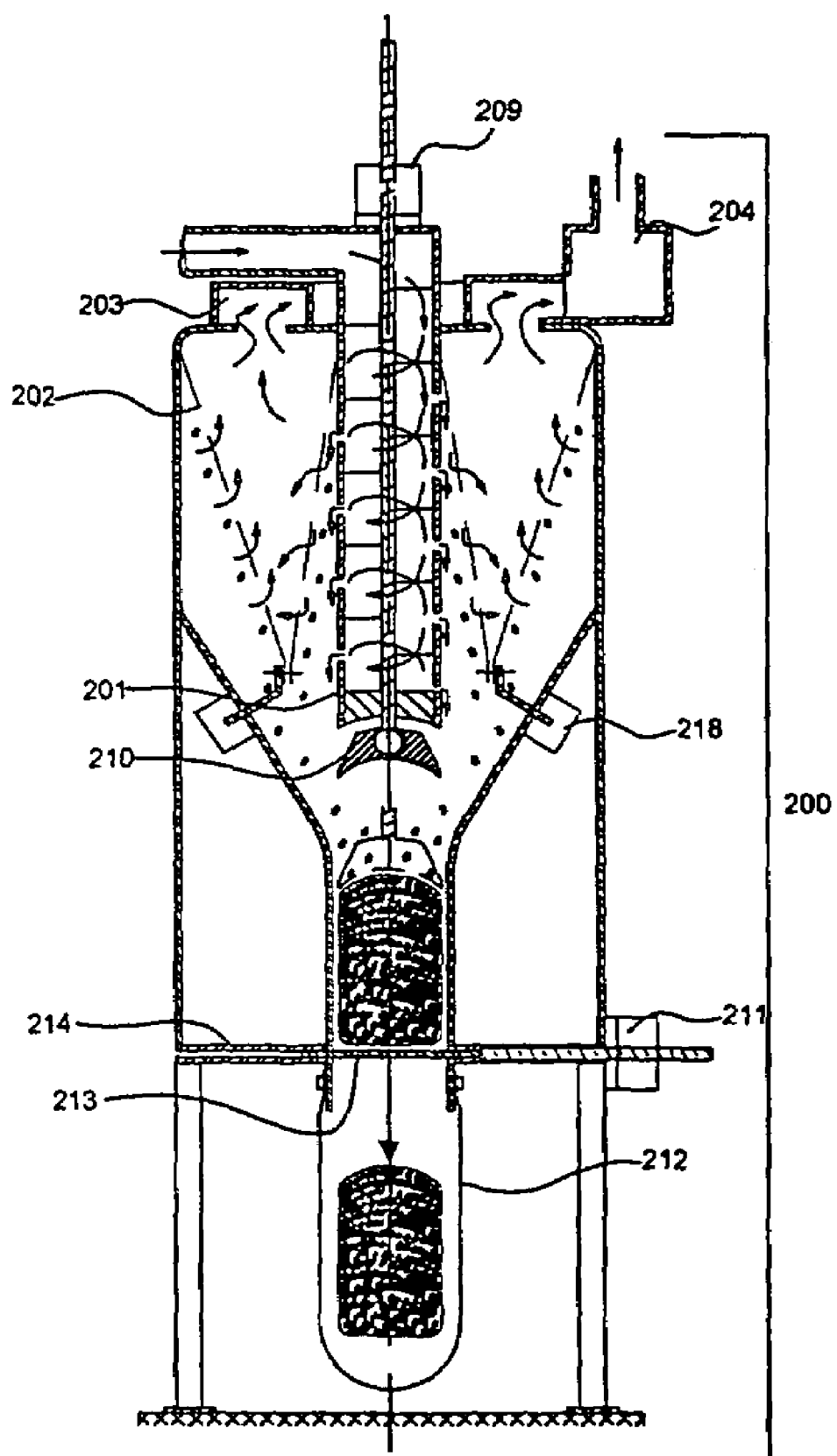
FIG. 18 is a modified cross-sectional view of soot processing drum with mechanical shaker.

Applications in which it is advantageous to collect the soot instead of incinerating it utilize a soot processing drum such as that shown in FIGS. 17 and 18. The function of the drum 200 is to separate and collect soot at the bottom of a cavity and compress it periodically until a compressed solid pellet is formed. The pellet is released into a container (plastic bag) for shipping and sale as a commodity to the chemical industry for applications such as printing. Sulfate and sulfuric acid are collected along with soot and the pellets can be brownish in color.

The soot drum 200 is comprised of an intake flow distribution auger 201. Two or four concentric conical barrier screens 202 may be installed in the surrounding space. The backsides of screens 202 are connected to the outlet manifold 203. The outlet manifold 203 is connected to a vacuum booster blower 204, which is used to create sufficient vacuum to drive a minimum flow volume through the drum 200.

As agglomerated soot collects on the screen 202, a soot layer builds up and the backpressure across the screen 202 increases. A mechanism, therefore, is necessary to blow off the soot layers. Two embodiments can be employed: back pressure pulsation as shown in FIG. 17, or screen shaking vibrator as shown in FIG. 18.

The back pressure pulsation consists of a small compressor 205 delivering compressed air into an air tank 206. The air tank 206 is piped to the back of the screen 202 and the compressed air is released via a control valve 207. Valve 207 is activated periodically allowing pulses of high-pressure air to flow to the backside of the screens 202 releasing the soot cakes. The released soot drops to the bottom of the cavity. A spring loaded check valve 208 is employed to guard against bypassing of the pulsed air.

At the core of the drum 200, a motor operated spindle 209 drives the compactor 210 downwards compressing the fallen soot into the cylindrical cavity until a certain calibrated load is reached. The motor stops and returns the compactor to the upward position ready for a second cycle. After repeated compaction cycles, the pellet grows until it reaches a certain height. An electrical signal signifying a full pellet has been formed, another motor-operated spindle 211 removes the bottom holding plate 213 away from the cavity. On subsequent cycle of the motor spindle 209 operation, the compactor drives the pellet to the bottom platform 214. The pellet is released to the bag 212 for removal and shipping.

The operation of the two motor spindles is controlled by a microprocessor (not shown) having a logic based on the stated sequence of steps. The soot-processing drum control is activated (on) when it is connected to the soot collection chamber. The process of emptying the chamber takes an average of five minutes for a truck application. Since loading a soot chamber could take three to six months of truck operation, a single soot-processing drum can serve a number of trucks as low as ten and up to several hundreds.

Another embodiment to release soot layers is a mechanical pulsator or shaker as shown in FIG. 18. The mechanical shaker 218 provides adequate release of the soot cake off the screen 202. For application where VOC content is high and soot is wet, reverse pulse jet approach is desirable. On the other hand, where the VOC fraction is low and soot is relatively dry, the mechanical pulsator/shaker approach may be preferred since it is simple and less expensive.

I. Particulate Converter—Quasi Agglomeration/Filtration

Figure 20:
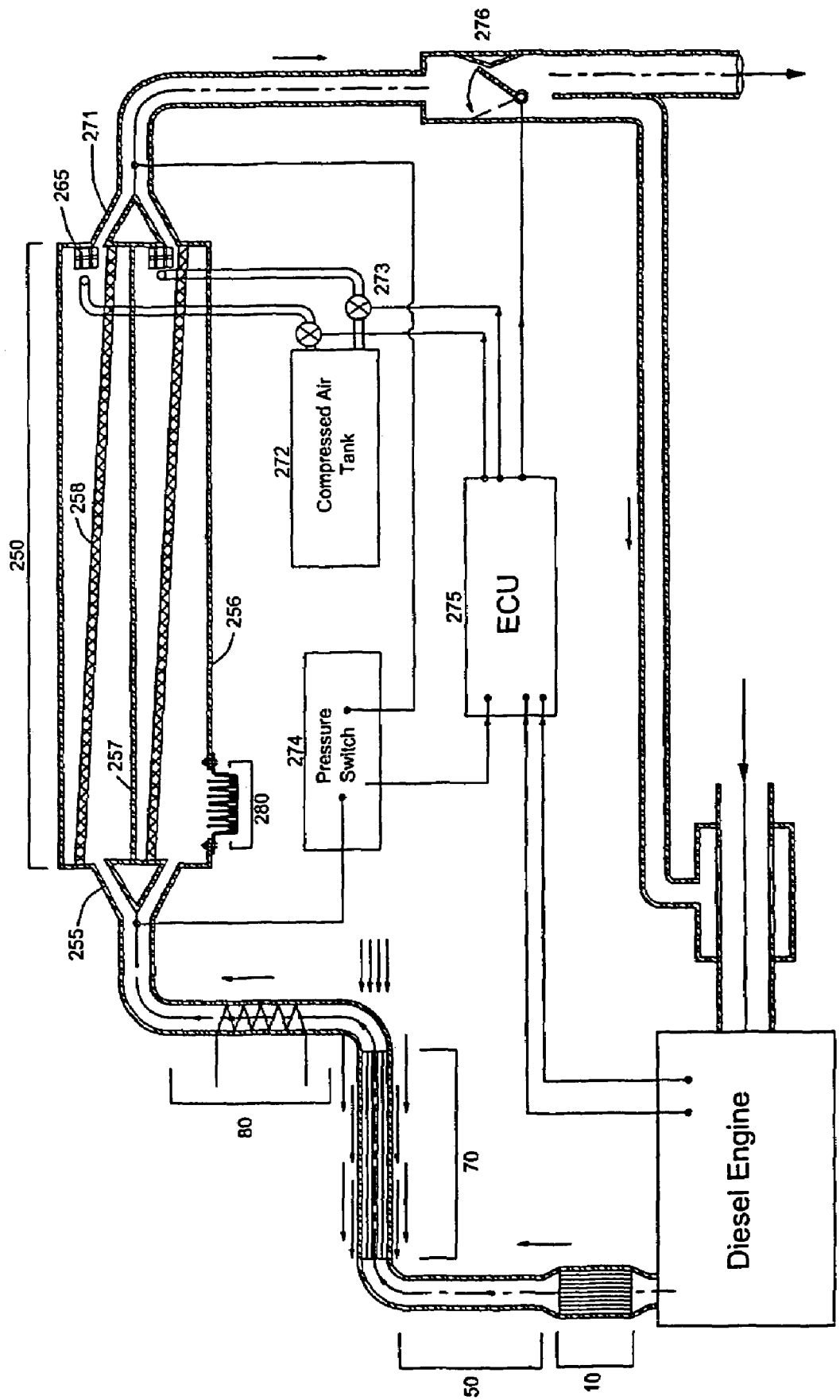
FIG. 20 is a schematic view of a flattened quasi agglomeration-filtration particulate converter and EGR for mobile application, illustrating exhaust flow according to the teaching of the present invention.

The quasi agglomeration/filtration particulate converter is intended for mobile source applications. The particulate converter can have single or multiple chambers. Shown in FIG. 20, is a converter with two chambers, which represents an embodiment for the majority of under-the-floor mobile applications. In a two-chamber configuration, the intake flow is split into the two chambers. Each flow segment is directed to a composite wire mesh or a quasi composite wool and filtration screen media as shown in FIGS. 24A and 24B. The composite steel wool media is characterized as being an agglomerator media having low-pressure drop and low soot retention capacity. On the other hand, employing retaining screens having proper size openings will provide an added filtration function. Dependent on the exhaust temperature and the ratio of the VOCs fraction in the soot, the screens accumulate soot on the upstream side of the exhaust stream. The accumulated soot can form a cake. These phenomena will increase the soot retention capacity/soot collection efficiency of the composite wire mesh media; and is accompanied with an increase in the pressure drop.

Figure 19:
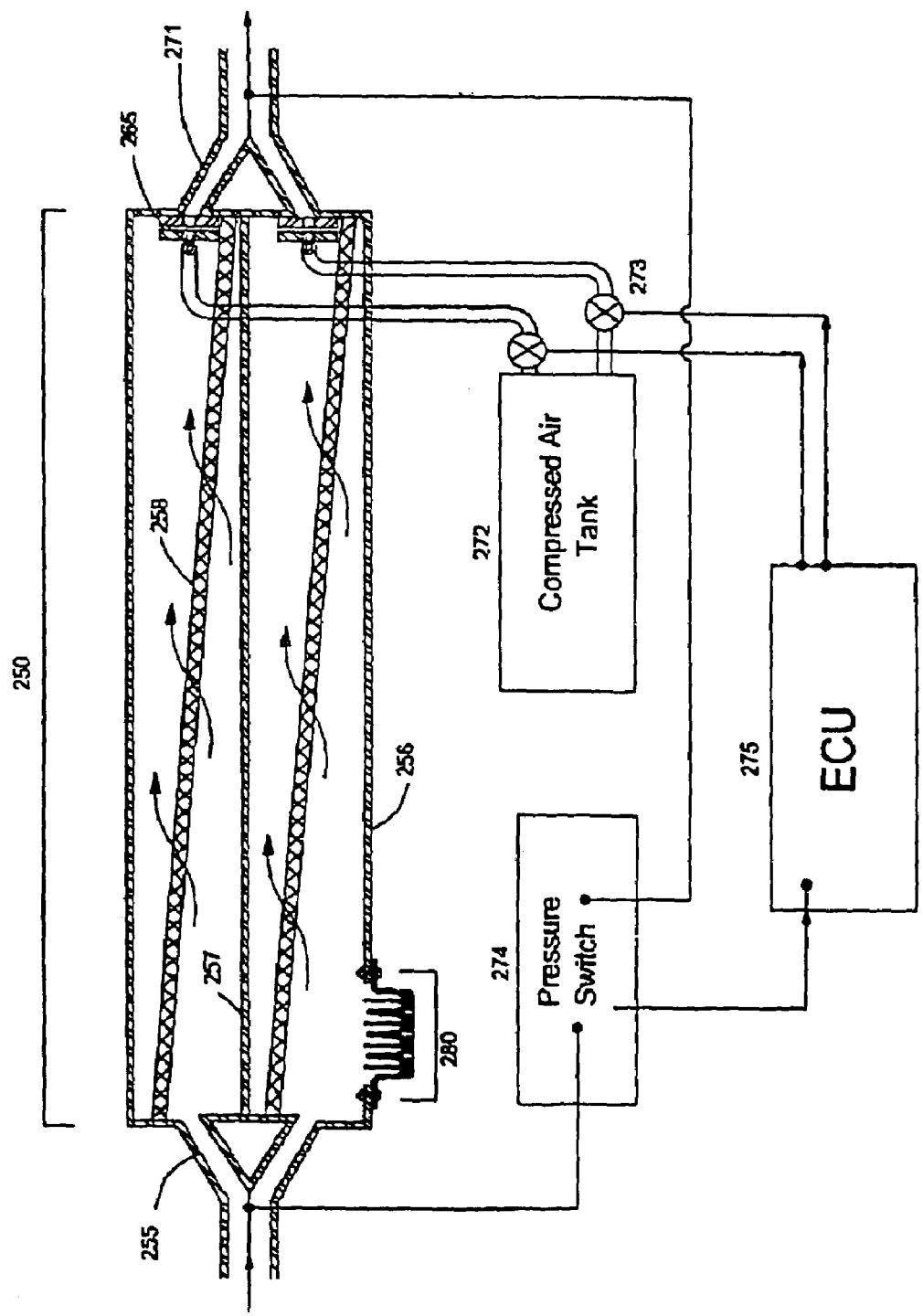
FIG. 19 is a schematic view of a particulate converter and EGR system for mobile applications.
Figure 25:
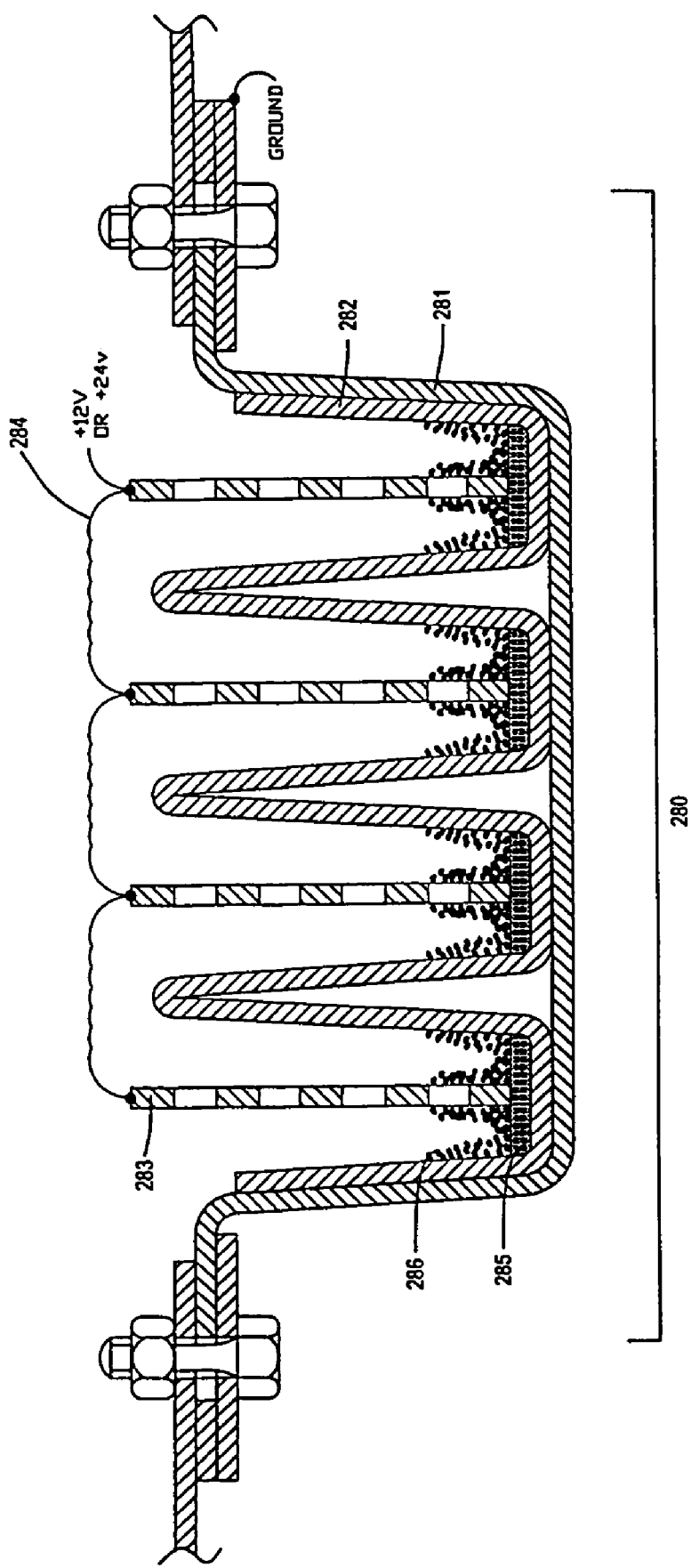
FIG. 25 shows a passive incinerator arrangement in conjunction with particulate converters of FIGS. 20 and 22.

The flattened quasi agglomeration/filtration converter is shown in FIG. 19 has an intake 255 for the diversion and expansion of the incoming flow to the chamber(s). The chambers are separated by a separator plate 257. Each chamber has the quasi agglomeration/filtration media 258. A passive sliding door mechanism 265 is shown in FIG. 23. The outlet 271 collects the clean exhaust and pipes it out. A passive incinerator 280 embodiment B is shown in FIG. 25.

The quasi agglomeration/filtration media of FIG. 19 can be made in one or multiple layers having different design strategies. To achieve the highest soot retention capacity and efficiency, the upstream layers are designed to capture larger particulates. The downstream layers are designed to capture smaller-size particulates. This would result in an almost even soot loading throughout the media and lowers the back pressure build up versus soot loading. FIG. 24A and FIG. 24B show three layers of steel wool and three layers of steel wool and screens, respectively.

Steel wool for the upstream layer may have an average fiber diameter of 16-25 microns (also referred to as mean hydraulic fiber diameter) and can have a packing density of 3%-6% (packing density is defined as the percentage weight of steel wool to the solid steel weight of the same volume). The screen could have a mesh count (defined as the number of openings per inch) of 50×50 or 20×50. Subsequent layers will have smaller fiber diameter, higher packing density and higher mesh count per inch, such as 25-32 μm fiber diameter, 4% to 8% packing density and 75×75, 100×100 mesh or 40×100 mesh. Soot characterized as having high percentage of VOCs would require larger fiber size, lower packing density and lower screen mesh count to cope with the "gummy effect" which would increase the pressure drop.

Figure 22:
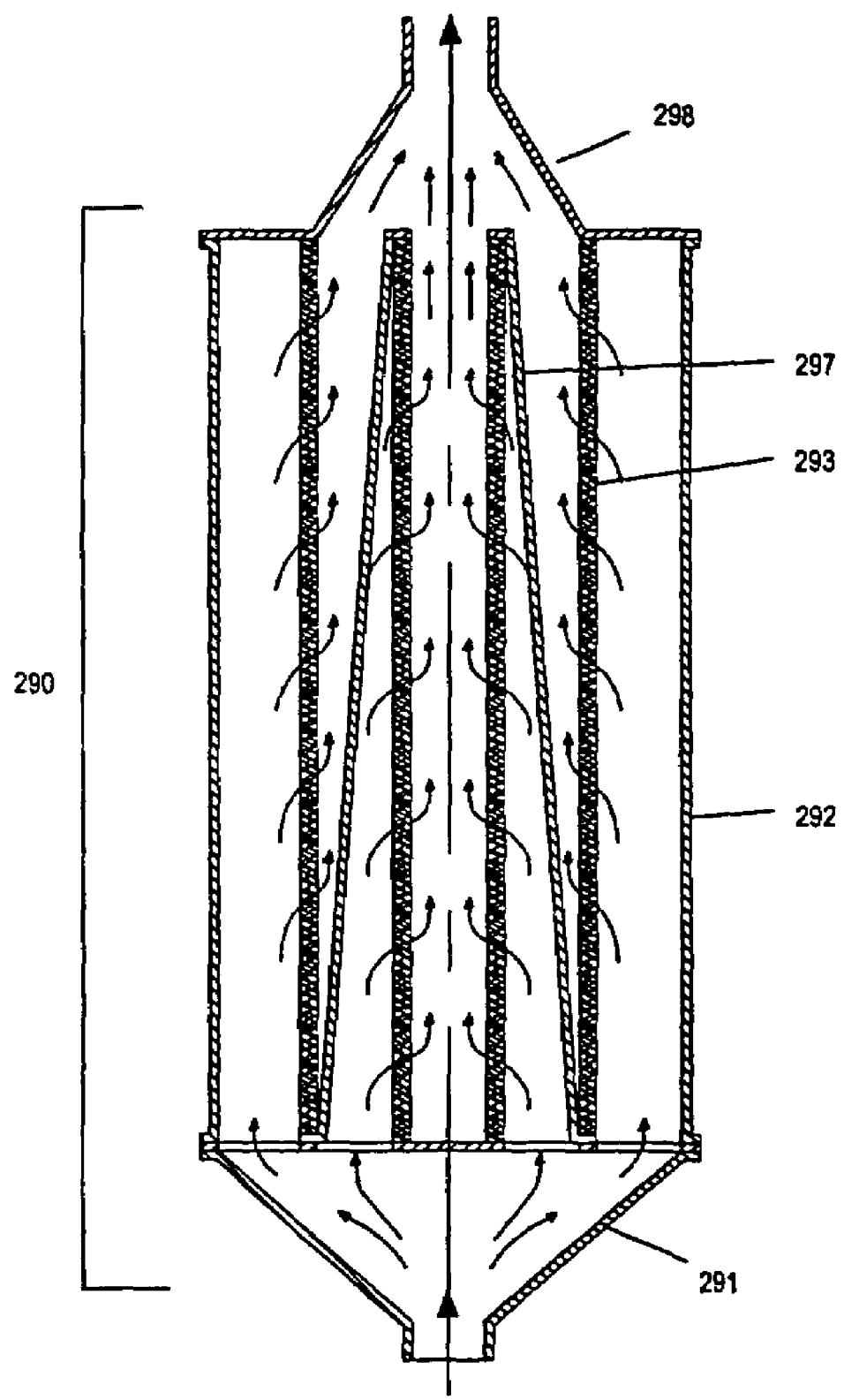
FIG. 22 is a cross-sectional view of a cylindrical quasi agglomeration/filtration particulate converter for mobile applications.

Another embodiment for a quasi agglomeration/filtration particulate converter is a round configuration as in FIG. 22. The embodiment of the wire mesh media is based on cylindrical design in which the wire mesh is cylindrical, the separator sheets are cylindrical, and the housing is also cylindrical. The converter can also have one or multiple chambers. This embodiment is desirable in certain truck applications such as those having vertical mufflers. FIG. 22. shows a typical round configuration having two chambers. All elements and logic of the round embodiment are essentially the same as those of the flattened embodiment J. Reverse Pulse Jet System As the composite wire mesh/steel wool media becomes loaded with soot at the upstream side, the soot dendrites migrate in the flow stream direction. The downstream layer of the media becomes eventually loaded with soot, and beyond a certain threshold, soot will begin to blow off (as agglomerated particles). As a result, the soot collection efficiency of the media begins to degrade and eventually it could have very low values.

Once the threshold of soot blow off begins, a reverse pulse jet is activated. This condition is triggered once a threshold value of pressure drop across the converter is reached. By pulsing high pressure compressed air on the downstream side of the wire mesh, the collected soot is blown off in the opposite direction of the incoming raw exhaust flow. The reverse pulse jet is designed to blow off sufficient soot allowing the mesh media to unload the amount of accumulated soot. The blown off soot settles at the bottom of the chamber through gravity. To prevent soot from being stirred up by the incoming exhaust gases, a perforated screen can be inserted in the lower compartment of each chamber. Soot falls through the perforations in the screen. Exhaust passes on top of the screen, while soot contained under the screen is trapped since no flow takes place. It is desirable to have pulsation of compressed air to take place at low exhaust flows such as idle condition or when the engine is turned off. This is desirable to maximize the effect of soot dislodging. The exhaust flow is in a direction opposite to the direction of the pulsed air, and as such, exhaust flow can have a counter effect to that of the pulse jet. Further, to maximize the effect of the pulse jet, a sliding door can be used at the clean exhaust outlet of each chamber. The door closes temporarily for a fraction of a second up to two seconds during pulsation to ensure that all pulsed air will pass through the wire mesh media.

K. Control Logic of the Pulse Jet System

Figure 26:
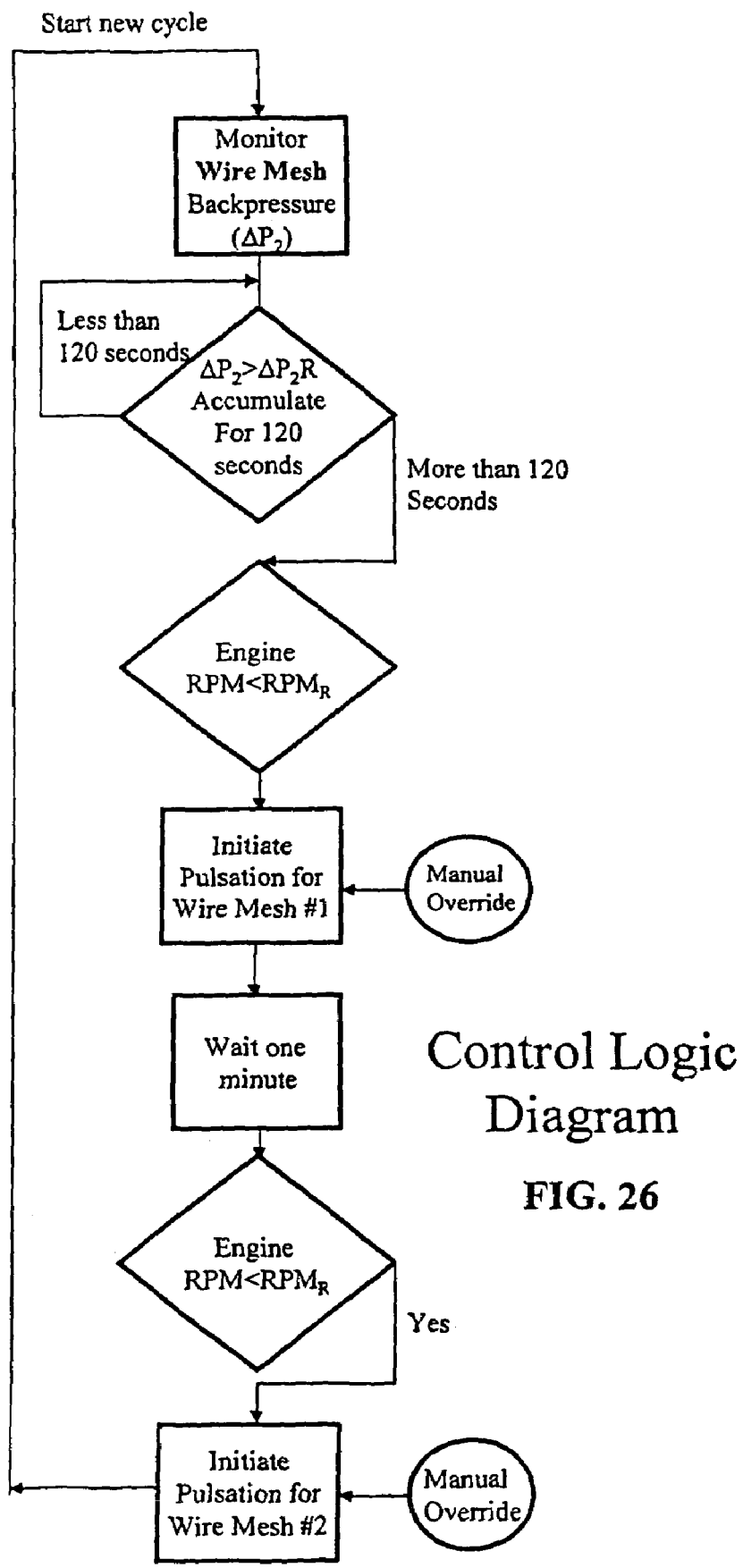
FIG. 26 is a control logic diagram for the control of reverse pulse-jet in a quasi agglomeration-filtration particulate converter.

The essential strategy of the control logic of the present invention is to dislodge the accumulated soot on the wire mesh media when a threshold value is reached, pulse the media, and bring it back to initial conditions to start another loading cycle. In real life during a vehicle operation, soot loading on the media can be measured through pressure drop measurement across the media. However, pressure drop is affected also with exhaust flow. Since it is desirable to limit pressure drop during vehicle operation, a simplified logic based on measurement of pressure drop is employed by employing a pressure switch. The pressure switch activates electric circuit when the threshold value is reached. Momentary high pressure drop is not representative of soot loading on the media. However, repeated high pressure drop during cyclic vehicle operation can be used as a measure of threshold soot loading in the media. The control logic, therefore, is based on adding the durations when the threshold of high pressure drop is reached, and when the total time accumulation reaches a predetermined value, the control logic initiate the pulsation process. Typical values of the threshold value for high pressure drop are in the range of approximately 40 to 60 inches of water. Typical values of the threshold of accumulated time at and above the pressure threshold value can be in the range of three to five minutes. Typical control logic of the reverse pulse jet is shown in FIG. 26.

When the conditions relating to the initiation of a pulse jet cycle are met, and the initiation process is activated, other conditions have to be satisfied. The first condition relates to engine RPM. Engine RPM has to close to idle or the engine is shut off. Since the pulsation process is less than one second, satisfying the low RPM condition is instantaneous, which can be simply accomplished once a vehicle comes to a stop. The second condition relates to the time required to refill the compressed air tank to pulse the next chamber. This time interval may be two to ten minutes dependent on the source of the compressed air on the vehicle. The control logic diagram is shown in FIG. 26.

L. Incinerator—Preferred Embodiment "B"

The incinerator most suitable for either the flattened or round embodiment is shown in FIG. 4. The incinerator is composed of a series of plates electrically insulated from each other as well as alternatively charged. The plates can be solid plates or perforated plates. Further, it is desirable to have the plates constructed from high-temperature resistant stainless steel and coated with highly active catalyst such as platinum. Where an incinerator is used, it is desirable to have the flattened converter slightly tilted in favor of allowing soot to migrate toward the incinerator as a result of gravity, exhaust gases pulsation, and on-the-road induced shock and vibration loading. The incinerator is activated once soot bridges the gap between adjacent plates having opposite charges. This allows high discharge of electric current which incinerates the soot quickly.

The incinerator volume is sufficiently high to store ash, an incineration by-product. It is estimated that the incinerator would require periodic disassembly and dumping of ash. Such clean up interval can be anywhere in the range of 25,000 to 150,000 miles of vehicle driving dependent on baseline particulate emission and driving cycles.

M. Exhaust Gas Re-Circulation

Exhaust gas re-circulation (EGR) as incorporated in the present invention resolves major problems commonly encountered with EGR in diesel applications. The first problem relates to the fact at idle and low-load engine operating conditions, insufficient pressure across EGR terminals exists, which reduces the flow necessary for targeted $NO_x$ reduction. This condition is prevalent at idle and low engine loading conditions. Incorporating a high-efficiency axial flow booster blower 241 resolves this problem. Blower 241 delivers the necessary flow to achieve desired NOx reduction as well as to ensure continuous scavenger flow at all engine operating conditions. At moderate to high engine loading conditions, the blower 241 will throttle the EGR flow due to high-pressure differential across the EGR terminals, almost functioning as EGR control valve and therefore consuming virtually no power. At idle and low engine loading conditions, it has moderate electric power consumption.

EGR flow is controlled through a simple control unit 242 having a logic based on engine RMP signal 243 and throttle position signal 244. This arrangement is most preferred for diesel retrofit applications. The EGR control logic is drastically simplified compared to OEM's logic. The EGR logic of the present invention is based on maximum $NO_x$ reduction and lowest fuel penalty, but would allow for any increase in visible emissions such as particulate, HC and CO. Increases in the visible baseline emissions and particulate are reduced through the converter system.

EGR System for the quasi agglomeration/filtration converter employs a diverter valve 276. The diverter valve position is controlled by a signal from the ECU unit as shown in FIG. 20. The diverter valve provides for the precise delivery of EGR flow by restricting the flow area to the tail pipe, and as such increases the pressure and in the EGR pipe to the engine air intake. EGR flow can be injected ahead of the intake air filter. This arrangement allows for even further removal of escaped agglomerated particles before entering the engine air intake system.

The EGR strategy of the present invention resolves the major known problems associated with EGR and can be summarized as: (1) EGR flow is augmented and controlled by booster blower; (2) EGR flow is cleaned of pollutants that can foul or contaminate engine air intake system; and (3) the exhaust gases are cooled to a low temperature before entering the particulate converter. Return EGR lines provide additional cooling. The exhaust gases re-circulated back to the engine may be considered sub-cooled EGR that resolves problems associated with volumetric efficiency and engine performance.

N. Water Scrubber

Where water is available, water may be injected in the exhaust pipe after the converter to capture active $NO_2$ gases from the exhaust stream. The water scrubber can also capture sulfate compounds. Alkaline may be added to the water to enhance the capturing efficiency of $NO_2$.

O. System Operation

Figure 2:
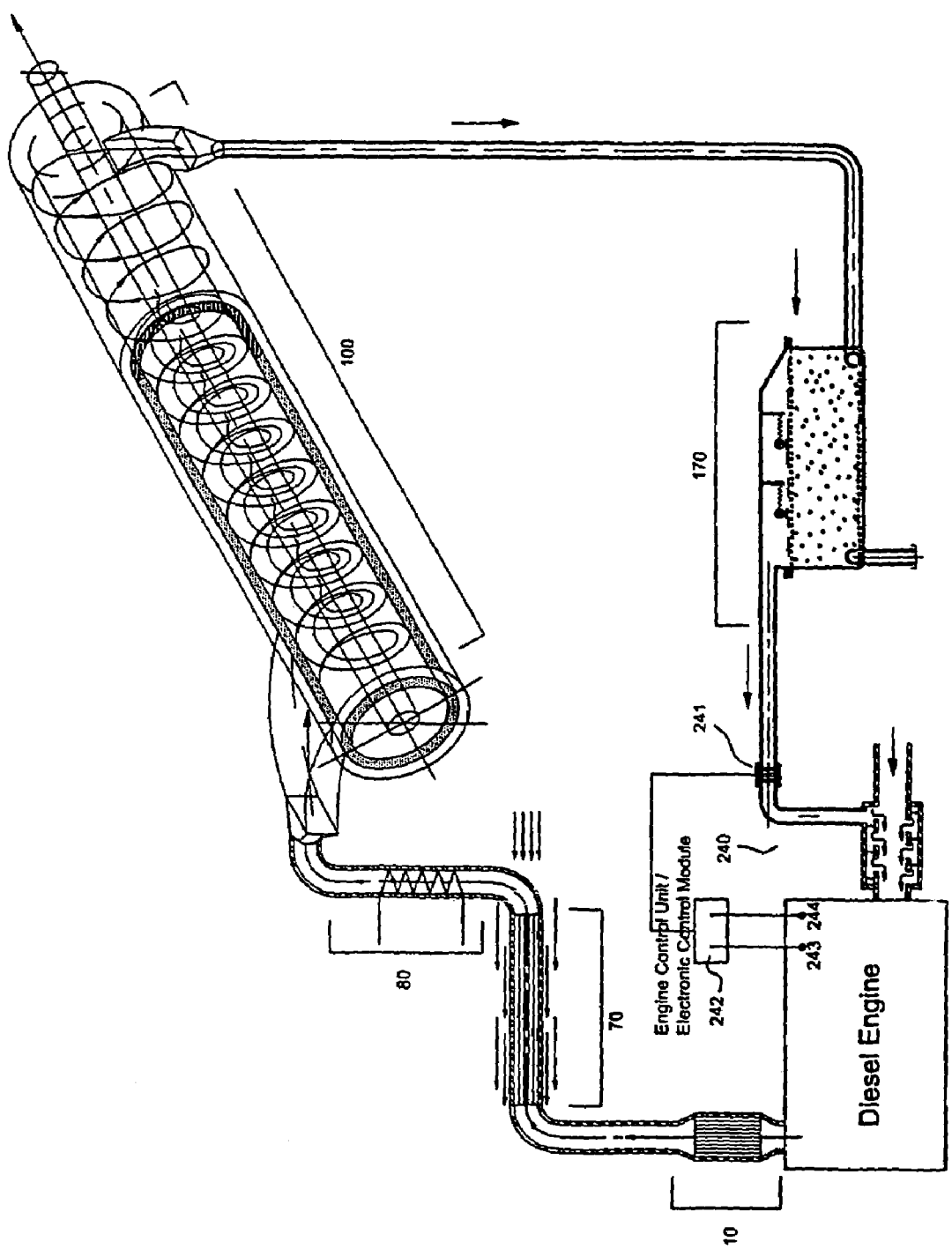
FIG. 2 is a schematic view of the particulate converter system illustrating exhaust flow with emphasis on controlling exhaust gas re-circulation according to the teachings of the present invention.

In most stationary applications, the systems of FIGS. 1 and 2 are employed. Such system is comprised of small diesel oxidation catalyst, cooling exhaust piping and the particulate converter. During the engine start-up phase a heavy transient smoke takes place and the oxidation catalyst is not active but the bulk of VOCs is relatively cold. In other words, these VOCs and particulates are condensed in the forms of liquid or solid nano-particles. These particles are collected and agglomerated at high efficiencies in the agglomerator. Cooling pipes during engine warm up, provide little or insignificant cooling effect. At low engine-load and during idle conditions, exhaust temperature and flow are low. As a result, the effect of centrifugal separation in the cyclonic separator is drastically reduced, which would impair the centrifugal separation of particles. However, this phenomenon is counter-balanced by two other phenomena: retention of soot in the agglomerator and significant reduction in turbulence and swirl effects. When the exhaust flow is low, such as at engine idle conditions, the aerodynamic drag forces on the soot dendrites webbed in the wire mesh are drastically reduced. This will result in lowering soot migration in the composite wire mesh media and changing of the agglomeration mode of operation to retention mode. In this case, the agglomerator will function as a filter. Turbulence and swirl are also reduced. The net effect still is exhaust clean of particulate and VOCs substances.

As the engine warms up and engine loading increases, exhaust temperature and flow increases. This condition activates the oxidation catalyst leading to the burn-up of hydrocarbon, carbon monoxide and the light fraction of VOCs compounds. The cooling pipes provides the function of reducing the exhaust gas temperatures to targeted low temperature of 250-300° F. under subsequent engine operating conditions.

Having exhaust cooled to 250-300° F. range can reduce exhaust flows from full load by as much as 40%. Further, the reduction in exhaust gas viscosity can reach 40% by cooling the exhaust from 900-1000° F. down to 300-250° F. range. The net effect is a reduction in the pressure drop across the particulate converter by a factor as high as 3.1 compared to that of a converter without the cooling piping. This factor is critical to comply with engine maximum allowable back-pressure specifications and it results in lower fuel penalty. Since the converter can provide a sound attenuation function, replacing the muffler with the converter system, the backpressure in the two cases could be a wash. The net effect is no increase in fuel penalty where a muffler is replaced with the converter.

Wire mesh agglomerators represent an effective media in capturing submicron particles compared to other known filtration media. Particle capturing mechanisms in wire mesh media are grouped into three modes: inertial impaction, interception, and diffusion. The first two modes of collection are not effective for small particle sizes, but will have appreciable single fiber efficiency once particle size increases. Diesel exhaust is characterized by having very small particles averaging 0.1 microns and significantly high number of nano-size particles. The diffusion mode of particle collection emerges as being the dominant mode of capturing diesel soot particles. Small particles display considerable random diffusive motion called Brownian movement, collide with gas molecules and consequently tend to deviate from gas streamlines. Ultimately, such particles are deposited on rigid surface such as fibrous surfaces or soot deposit between the fibers upon collision with such rigid surface. The equations representing the small particles single fiber collection efficiency (diffusion mode) and the overall collection efficiency are given in the formulas below:

The single fiber collection efficiency due to diffusion ($\xi_d$) is:

$$\xi_d = 27 Pe^{-2/3}[1 + 0.39 K^{-1/3} \cdot Pe^{1/3} \cdot Kn] + 0.624 Pe^{-1}$$

where Pe is the Peclet number given by: $Pe = V d_f / D$
where V is the linear gas velocity, $d_f$ is the effective fiber diameter
and D is the diffusion coefficient or particle diffusivity which is calculated by $$D = C\, K_b T / 3 \pi \mu_g d_p$$

where C is Cunningham correction factor, $K_b$ is Boltzman constant, T is the absolute gas temperature, $\mu_g$ is the gas viscosity, $d_p$ is the particle diameter, and $K_n$ is Knudsen number calculated by:

$$K_n = 2\lambda / d_f$$

where $\lambda$ = mean free path of gas molecules, $d_f$ = effective fiber diameter.

The overall collection efficiency in fibrous media is given by:

$$\xi_f = 1 - EXP^{-4 \xi_d \alpha H / \pi d_f}$$

Where: $\alpha$ is the fiber packing density and H is the filter thickness.

The above formulas are for the diffusion mode of particle collection only, which is the primary mode. The other two modes or particle collection are simply set aside due to their small effect, but when considered, the total collection efficiency is slightly higher. Solving the above equations for different values of particles sizes shows exponential increase in the single fiber efficiency as the particle size decreases. For example, particles having a size of 1.0 micron have a single impaction fiber efficiency of 0.001. Particles having a size of 0.1 micron have a single fiber interception efficiency of 0.0007 and a single diffusion fiber efficiency of 0.05. Particle sizes in the nano range, such as 0.02 microns (20 nano-meter) have a single fiber interception efficiency of 0.0001 while the single particle diffusion efficiency of 0.300. These illustrations are for a classical case of wire mesh media with $\alpha = 0.005$, $d_f = 10$ microns, $V = 8$ cm/second, $T = 200°$ C.

It should be noted also that foregoing formulas are for green fibrous media (i.e., without having soot dendrite build up). Once soot starts to build up on the fibrous media, it functions as another fibrous media having very small fiber size, increasing the particle capturing efficiency even higher. The capturing efficiency of nano-particles can be as high as an order of magnitude of $10^5$ (i.e. only one particle out of $10^5$ incoming particles expressed by the number of captured particles escapes through the fibrous media). Further, in agglomerator design, the wire size is large and the average spacing between wires is in excess of 50 microns. This feature allows for the collected/captured dendrites to migrate until they leave the fibrous media. From testing data, the effect of captured soot dendrites on the fibrous media displays the dominant mode of particle collection compared to the metallic fibers. This leads to the terminology of green agglomerator, which refers to a new fibrous media.

It will be appreciated by those skilled in the art that the major differences between a filter and agglomerator is retention efficiency which should be high in a filter and zero in an agglomerator. In diesel engine applications, the flow velocity varies considerably between idle and full load. At idle conditions the agglomerator functions as a filter media due to low flow velocities and can accumulate a significant amount of soot. At full load, the agglomerator could blow off more agglomerated soot dendrites than incoming soot. However, over a wide range of operation encompassing idle, medium and full load conditions, the average agglomerator retention (trapping) efficiency is zero. Where soot is blown off at certain location, in the agglomerator, such a condition is self-corrected. Where soot blows off, more flow is rushed into that area and consequently higher soot build up takes place until equilibrium conditions with the balance of the media are reached. The back pressure across the particulate converter can increase by about 50% at prolonged idle conditions of five hours. When the engine speed increased from 800 RPM to 1100 RPM for five to ten seconds, the backpressure dropped by 40%. This is a self correcting mode for excessive soot build-up.

The agglomerated particles can be directed to the electrical incinerator, where incineration takes place at soot build up reaching a threshold a point to an electrical circuit. Due to high electrical conductivity of the soot, a rush current heats the soot instantly. In the presence of oxygen in the exhaust, and the platinum coating on the incinerator screens, soot is incinerated at low temperature very quickly, typically in 3 to 5 seconds. Since incineration is localized and intermittent on the incinerator screen, the temperature rise downstream of the incinerator is insignificant. Also, due to the limited amount of soot incinerated at a given location, limited oxygen content in the exhaust and the very small exhaust velocity across the screens, the local temperature rise is moderate and would not result in damage to the screens. By-products of incineration are $CO_2$, $H_2O$ and ash. Ash falls to the bottom of the incinerator cavity due to vibration and gravity. Since such cavity has large size, ash accumulation for the equivalent of 200,000 to 400,000 miles of driving can be stored before the cavity needs to be cleaned up. However, cleanup intervals of 150,000 to 200,000 miles are recommended.

Exhaust gases leaving the incinerator are cleaned of particulate matter and are cool. They can be used as an EGR for moderate reduction in $NO_x$ emission. Should higher reduction in $NO_x$ emissions be desirable, a booster pump is used to increase and control EGR flow. The control logic of the booster pump takes into account maintaining scavenger flow at low engine loads and ensuring the proper amount of exhaust flow is re-circulated resulting in maximum reduction of $NO_x$. To minimize impact on fuel economy, controlled EGR flow is administered at all engine operating conditions. Absent from this EGR control logic is the minimization of particulate engine emission since the after-treatment system handles such excessive emission very effectively.

Diesel engine applications where sufficient cooling water is available stationary, marine, and irrigation, opportunity arise to increase $NO_x$ reduction beyond that generated from EGR. In this case, an active platinum oxidation catalyst is recommended. This catalyst oxidizes $SO_2$ to sulfates and oxidizes 50-70% of NO to $NO_2$ dependent on exhaust temperatures. Sulfate can be collected along with particulate matter provided that the exhaust gases are cooled to temperatures below sulfate condensation temperature and are collected with particulates in the Converter. The exhaust gases leaving the converter can be scrubbed with water reducing exhaust temperatures to 200-150° F. This allows the capturing of reactive $NO_2$ gases by water. It would be desirable to add alkaline substances to the water. Dissolving of $NO_2$ in water will result in forming nitric acid. Such highly diluted portion of nitric acid has insignificant effect on large bodies of water, and could have beneficial effects in irrigation applications. In summary, sulfuric acid and particulates are collected in the soot chamber while the nitric acid portion is discharged and dissolved in water instead of being discharged in the air.

Figure 27:
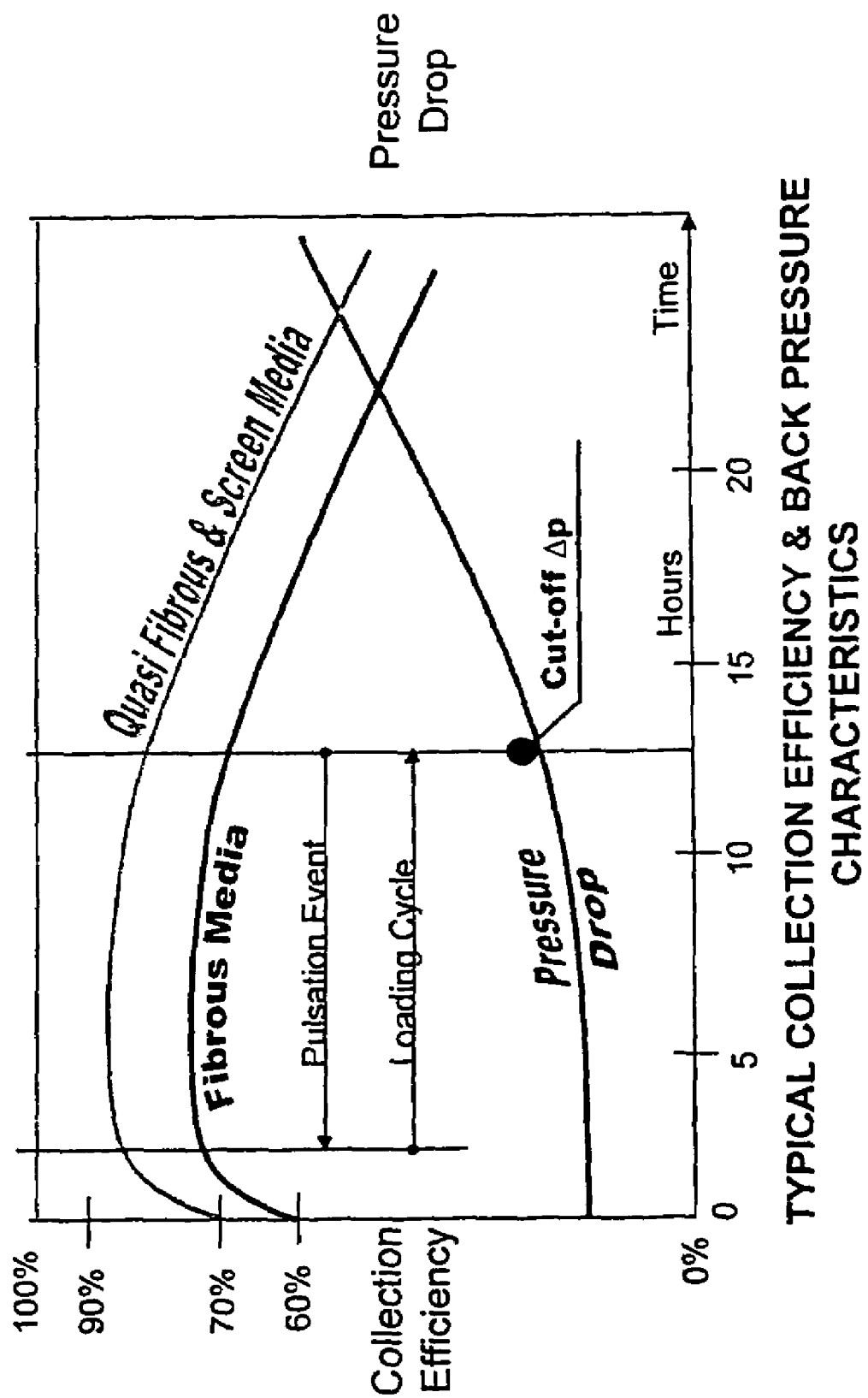
FIG. 27 shows typical collection efficiency and back pressure characteristics of quasi wire mesh media with and without filtration screens.

Small diesel engine applications, where experience is in the transient mode of operation, requires adaptation of reduced after-treatment hardware. A critical factor is the size and complexity of the hardware. This led to the development of another embodiment employing quasi agglomeration/filtration media. Such media is characterized by low filtration efficiency, but upon accumulating the first layer of soot the collection efficiency increases. The presence of filtration screens enhance the collection efficiency as layers of soot are collected on the upstream side of the screen. The soot collection efficiency remains essentially steady for a significant time, which varies from 8 to 40 hours of operation dependant on engine emission. Thereafter, as the composite media becomes saturated with soot, soot blow-off will start to take place and the pressure drop continues to increase. At a certain threshold of pressure drop, the media needs to rejuvenate or regenerate to the initial condition equivalent to the beginning of the soot loading cycle, but with some soot still left in the composite media to maintain high soot collection efficiency. This led to the adoption of the technique of reverse pulse-jet. Typical collection efficiency and back pressure characteristic for the quasi media showing the effect of reverse pulse jet and the start of a new loading cycle are shown in FIG. 27.

The reverse pulse jet technique is most unique in that it lasts for a fraction of a second; it can be activated when the engine is off or at idling conditions. This allows for maximizing the effect of reverse pulse-jet since it flows in the opposite direction of exhaust flow. As such, exhaust flow weakens the effect of the reverse pulse-jet. Once pulse-jet is activated soot is blown off the media to upstream side; and the media is rejuvenated and ready for another cycle of soot filtration and collection.

Tests conducted on a quasi agglomeration/filtration converter on an old 1985 diesel truck showed soot filtration efficiency of 40% on a "green" converter. After accumulating about 400 miles, the efficiency climbed to 90%. Continued operation for an additional 500 miles increased the back pressure to 60 inches $H_2O$ at 55 mph. The system was then pulsed with compressed air. There is no noticeable change in collection efficiency afterwards. It was also observed that suspension-induced vibration on the converter due to road conditions assisted with slowing the rate of pressure drop build-up as a function of mileage. Upon examining the unit, considerable cake build-up was observed on the composite media and the filtration screens. The foregoing soot cake could break off the media due to road induced vibration which can lower back pressure. Around one pound of soot was removed from the bottom of the two chambers after 1000 miles of driving.

Where an incinerator is employed with the converter, the converter is mounted with a slant to have the incinerator at the lowest point to assist with the migration of the soot to the incinerator cavity. Such a converter with an incinerator is expected to be a maintenance-free device requiring the cleanup of accumulated ashes every 150,000 to 200,000 miles.

Figure 21:
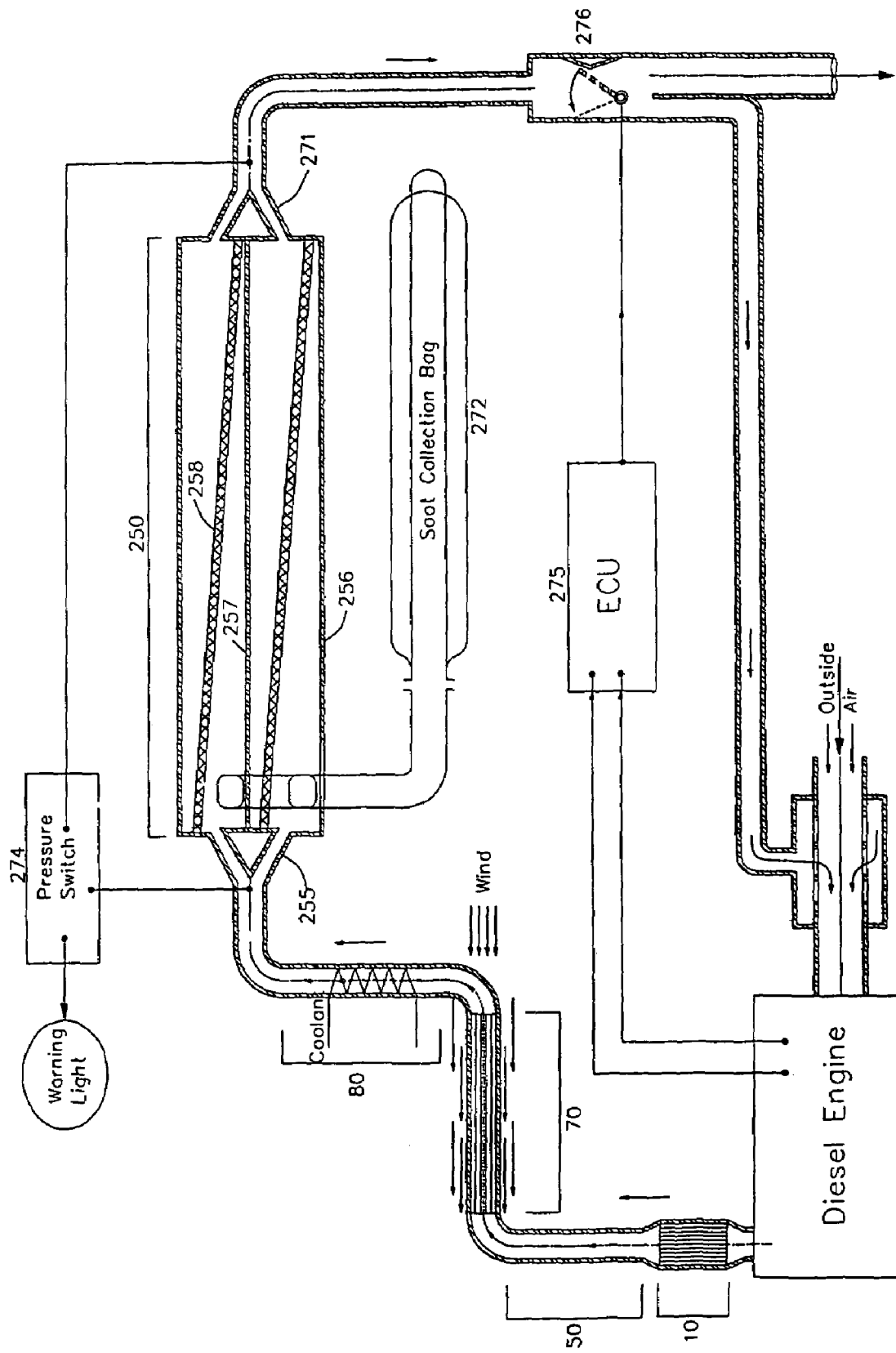
FIG. 21 is a schematic view of a flattened agglomeration-filtration particulate converter for mobile applications, illustrating exhaust flow with emphasis on different reverse pulse-jet scheme and the use of soot collection bag.

A converter having soot collection bag 272 as shown in FIG. 21 does not necessarily need an incinerator. Such converters also do not have to have the reverse pulse-jet system installed as an integral part of the converter. Rather, the pulse system can be stationary and serve multiple vehicles. The reverse pulse air system is activated through the exhaust tail pipe and the pulsed jet works on all converter chambers simultaneously. The bag size should be sufficient to expand to accommodate the volume of the pulsed air at ambient pressure. The pulsed air sweeps the soot collected at the bottom of the converter into the bag. For this type of operation, soot is swept into the bag during each reverse pulsation event. When the bag is loaded with soot, it would be replaced with an empty bag. It is estimated that bag replacement takes place every 6 to 30 months dependent on base line emission. Such system arrangement is attractive for the retrofit of mobile truck and bus application when the vehicles are housed in a maintenance garage at least once every week.

The agglomerator section could be structured around a perforated/knitted tube where the composite wire mesh media is wounded. Such assembly is referred to as a candle. Typical candles have an interior diameter of 55 mm, exterior of 100 mm and length of 90 cm. Any number of the candles can be employed in a housing dependent on exhaust gas flow to be treated. Typical arrangements for mobile applications employ 7, 10, or 13 candles in housing.

The composite wire mesh can be selected to provide one of two distinct functions: full agglomerator or quasi filtration/agglomeration. Full agglomeration function is characterized by having incoming soot particles in the nano-to-submicron agglomerated range into large-size particles in the 50 to 200 µm range. The wire mesh media is selected to provide pressure drop across the media to be self-regulated. As such, once a threshold of back pressure across the media is reached, due to excessive soot loading, the aerodynamic drag forces push the soot dendrites to be blown away from the media, and the pressure drop consequently is reduced. The cycle of loading and unloading continues, with the exhaust flow-rate being the dominant factor affecting soot blow-off. Separation of agglomerated large soot particles downstream from the candles can be accomplished through particle separator devices.

Figure 29:
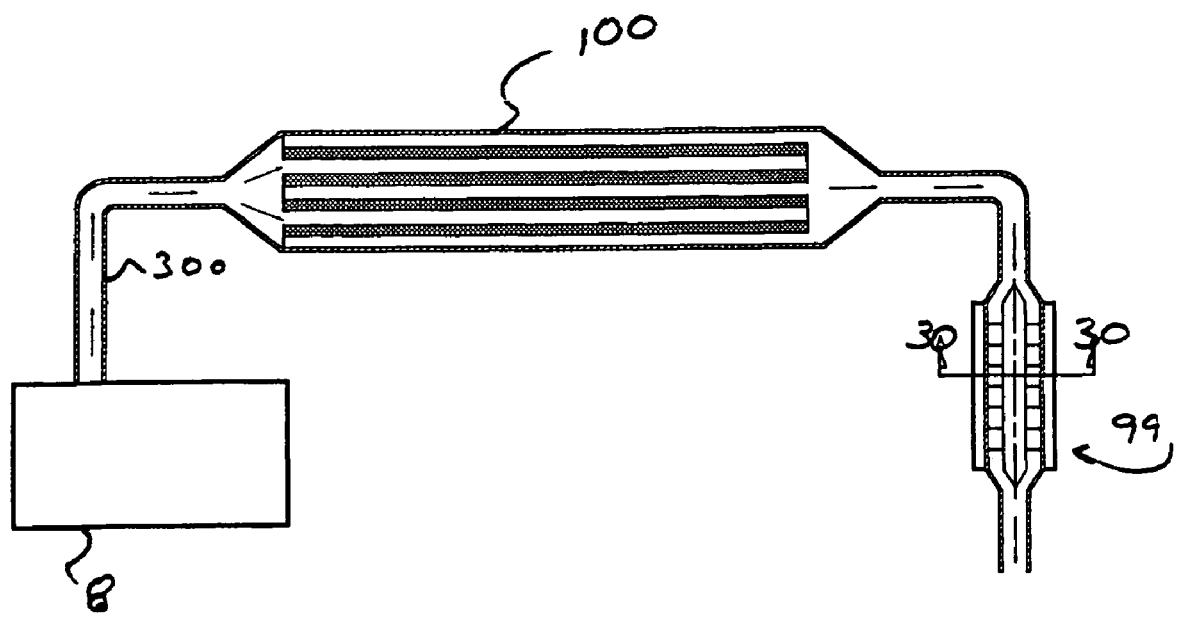
FIG. 29 is a schematic view illustrating a converter system of the present invention with full agglomerator and centrifugal separator.
Figure 30:
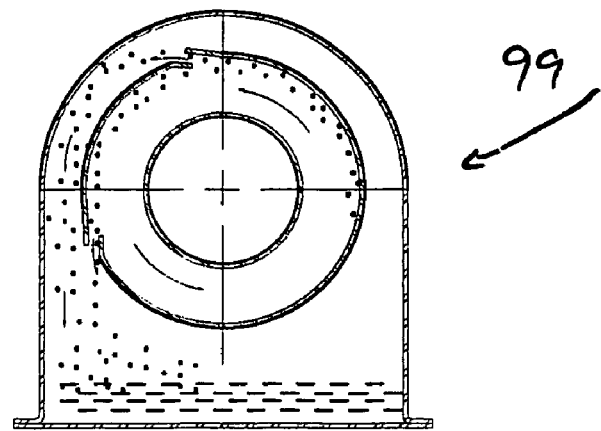
FIG. 30 is a cross-sectional view taken along the line 30-30 of FIG. 29.
Figure 32:
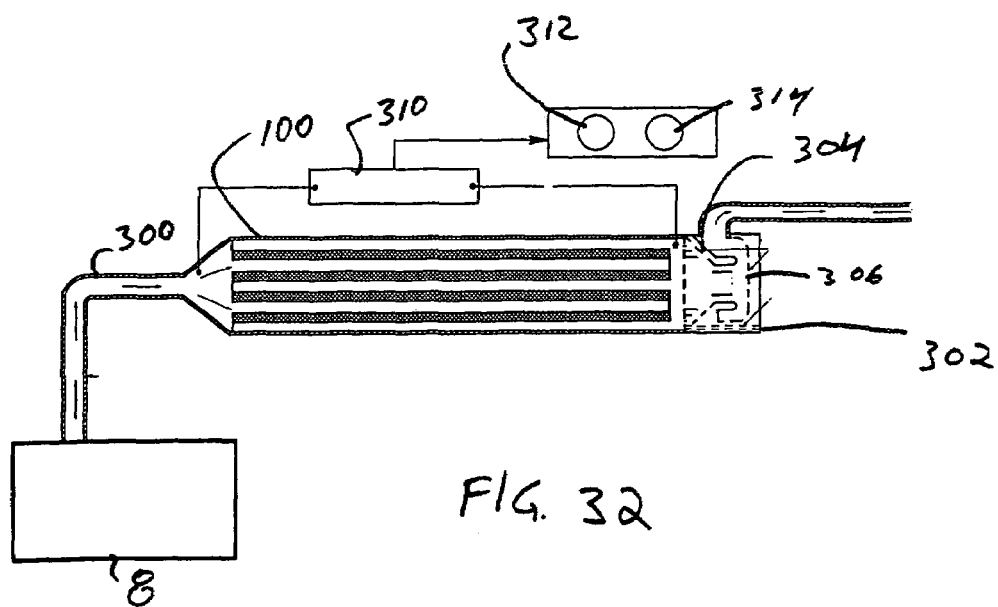
FIG. 32 is a schematic view of a converter system of the present invention with a isokinetic particle separator.

Either a centrifugal separator or an isokinetic separator can be employed as shown in FIGS. 29 and 32. The centrifugal separator or the isokinetic separator can employ an incinerator in the collection bin area. Alternatively, soot can be stored in the bin area and periodically removed for disposal. As shown in FIG. 29, the diesel engine 8 is connected to one or more particulate converters 100 through a long radiant piping 300. The opposite end of each particular converter 100 is connected to a centrifugal separator 99. Clean exhaust exits the separator 99. As shown in FIG. 32, a combined isokinetic particle separator and incinerator 302 is coupled to the particular converters 100. As discussed above, the combined isokinetic particle separator and incinerator 302 includes an impingement plate 304 and core 306. Clean exhaust exits the combined isokinetic particle separator and incinerator 302.

As further shown in FIG. 32, a pressure switch 310 monitors pressure drop across the particulate converters 100. Upon detection of a first predetermined pressure drop, a first warning light 312 on the vehicle dashboard is illuminated. In one application, the first warning light 312 may be yellow to indicate a non-urgent need to regenerate the filter media. Upon detection of a second, greater pressure drop, a second warning light 314 is illuminated. The second warning light may be red to indicate a more urgent need to regenerate the filter media.

Figure 31:
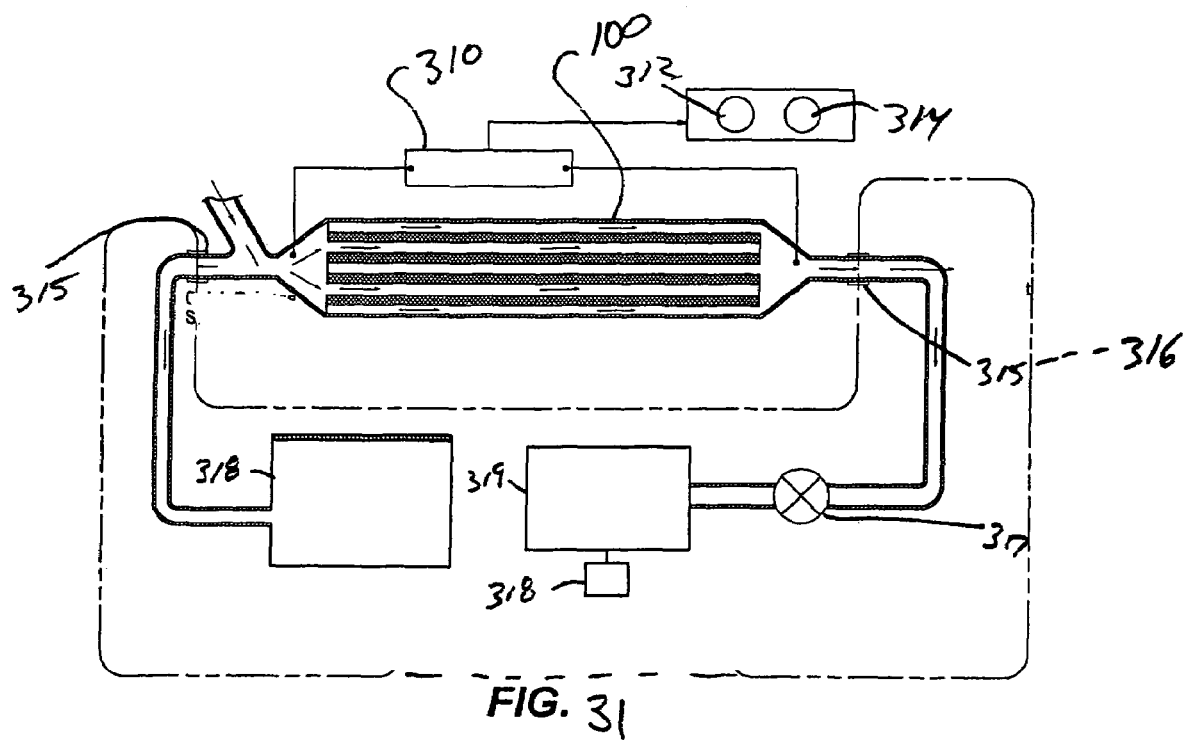
FIG. 31 is a schematic view of a converter system of the present invention with a reverse pulse jet.

The case for the quasi agglomeration/filtration converter is shown in FIG. 31. The agglomeration media herein is characterized as having higher packing density and higher number of screens. The purpose here is to enhance soot retention capacity of the media and to minimize soot blow-off. This is accomplished at the expense of back pressure across the media. As more soot continues to build up across the media and is retained, the back pressure increases. Back pressure monitor 30 signals the need for pulsation to take place. A pulsation platform 316 (circumscribed by dashed lines), which is stationary, is connected to the exhaust as shown in FIG. 2 with quick release sealed couplings 315. Soot can be collected in a bag or a tank 318. As shown, a 10 gallon, 100 psi compressed air tank 318 powered by an air compressor 319 delivers air pulses through a pulsation valve 317. The valve 317 has an opening time of 0.02 to 0.04 seconds.

Figure 33:
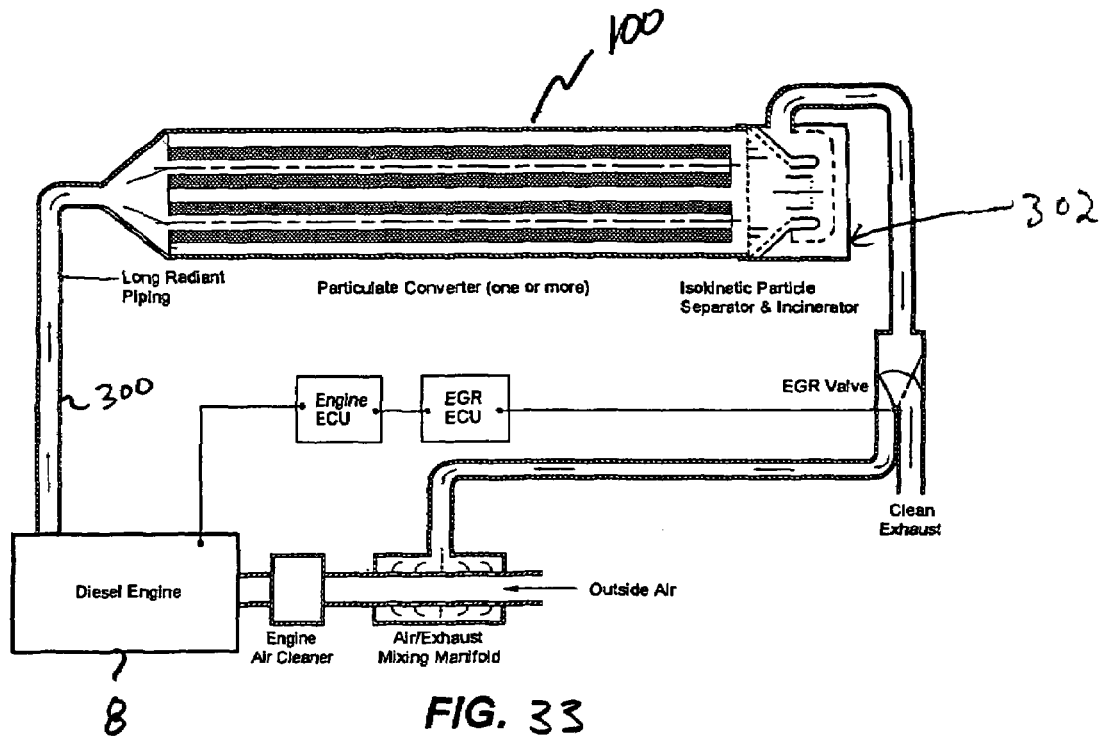
FIG. 33 is a schematic view of a converter system of the present invention with an isokinetic particle separator and exhaust gas recirculation.
Figure 34:
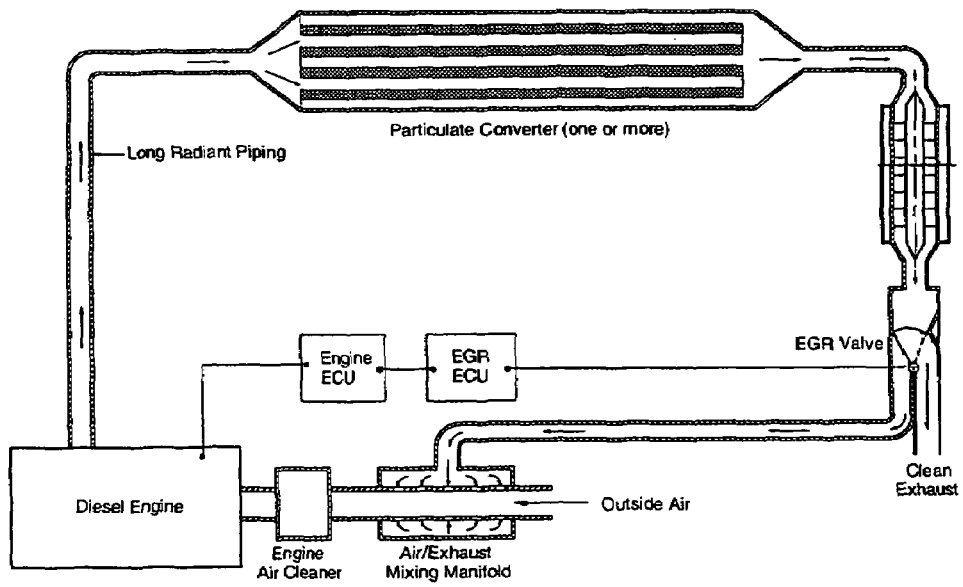
FIG. 34 is a schematic view of a converter system of the present invention with a centrifugal separator and exhaust gas recirculation.

Employing either a full agglomeration or quasi agglomeration/filtration converter leads to the adaptation and support for EGR function as shown in FIG. 33 and FIG. 34. More particularly, FIG. 33 schematically illustrates the system of FIG. 32 to further incorporate an EGR function. As shown, outside air enters the manifold, passes through an engine air cleaner and is delivered to the diesel engine 8. Exhaust from the diesel engine 8 is delivered to the particulate converters 100 through the radian piping 300. After particle separation and incineration, the exhaust may be selectively rerouted to the manifold with the EGR valve. FIG. 34 illustrates a similar arrangement in which the isokinetic particle separator and incinerator is replaced with a centrifugal separator.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A diesel exhaust after-treatment system for the cleanup of regulated and unregulated pollutants from an exhaust of a diesel engine, the system comprising:
   a diesel particulate converter having an agglomerator for the agglomeration of particulate matter and a separator for the separation of particulate matter, the agglomerator constructed of composite wire mesh media;
   a soot collection chamber for collecting and retaining entrapped soot;
   an exhaust cooling system for cooling the exhaust; and wherein the exhaust-cooling system includes a radiation mode cooling section, a first convection mode cooling section utilizing a source of ambient air to cool the exhaust, and a second convection mode cooling section utilizing a source of liquid to cool the exhaust, the radiation-mode cooling section includes one or more pipes having larger surface area than conventional piping and a blackened outside surface, for maximum cooling effect.

2. The exhaust after-treatment system of claim 1, further comprising an exhaust gas re-circulation system circulating the clean exhaust leaving the particulate collection chamber to a port downstream from an engine air filter.

3. The exhaust after-treatment system of claim 1, further comprising an oxidation catalyst.

4. The exhaust after-treatment system of claim 1, wherein the diesel particulate converter for the agglomeration and separation of particulate matter from the exhaust includes:
   a housing;
   a centrifugal separator having a core pipe radially centered in the housing, the core pipe having a plurality of windows for capturing clean exhaust streams; and
   a plurality of helical augers extending from the core to the agglomerator such that the exhaust enters the centrifugal separator at an upstream end, is then forced into a cyclonic helical motion and exits at a downstream end.

5. The exhaust after-treatment system of claim 4, wherein the centered core pipe captures and collects clean exhaust layers in a progressive manner as such clean layers develop through the plurality of windows.

6. The exhaust after-treatment system of claim 5, wherein the plurality of windows are configured to have clean exhaust layers change flow direction radially toward the core pipe, thereby preventing fugitive particles from re-entering the clean air stream.

7. The exhaust after-treatment system of claim 5, wherein the windows are configured to have openings extending from a middle of the flow channel toward the auger, the openings stopping short from the auger, thereby preventing re-entry of fugitive particulates caused by swirl phenomenon.

8. The exhaust after-treatment system of claim 1, wherein the composite wire mesh has variable wire sizes and compact densities, the agglomerator wires and densities have void spacing in excess of 50 microns to avoid plugging up during all engine operating conditions.

9. The exhaust after-treatment system of claim 1, wherein the soot collection chamber includes a retaining screen to provide barrier media for the trapping of agglomerated soot, the chamber design and mounting cause such soot cake built on the bottom of the screen to fall to the lower half of the chamber.

10. The exhaust after-treatment system of claim 1, wherein the soot collection chamber includes a vibrating system having a spring and steel ball excitable from vehicle pulsation and vibration, the steel ball for causing a hammering action at selected locations on the screen to continuously release soot cakes and prevent the soot cakes from building up.

11. The exhaust after-treatment system of claim 1, further comprising a soot processing drum for collecting agglomerated soot from a large number of soot collection chambers, the drum compresses soot into solid pellet for shipping and use in industrial applications.

12. The exhaust after-treatment system of claim 1, wherein the soot-processing drum includes a back pulsation system for periodically cleaning the screen assembly from soot build up.

13. The exhaust after treatment system of claim 1, wherein the soot-processing drum includes a mechanical vibrator for continuously releasing the screen assembly from soot build up.

14. An exhaust after-treatment system for the clean up of regulated and unregulated pollutants from the exhaust of a diesel engine, the system comprising:
    diesel particulate converter having a wire mesh media for the agglomeration of particulate matter;
    an air pulsation system in fluid communication with the diesel particulate converter;
    a sensor for sensing a pressure drop across the particulate converter and generating a control signal in response to the pressure drop having a predetermined value;
    an electronic control module (ECU) for activating the air pulsation system to remove particulate matter from the wire mesh media;
    an incinerator; and
    wherein an air pulsation system is a reverse pulse jet system including a compressed air tank, a pulse valve and passive sliding door within the housing of the particulate converter; and
    wherein a passive sliding door assembly is activated through the incoming pulsed air causing the sliding door to close, that such action will force all of the incoming pulsed air to go through the quasi agglomeration/filtration media to ensure effective soot blow off, that such sliding door will return to the open position at the conclusion of pulsation through a compression spring action.

15. The exhaust after-treatment system of claim 14, wherein the ECU monitors engine operating condition and initiates pulsation only when the engine is off or at idle condition to maximize the effect of reverse pulse jet on the media.

16. A diesel exhaust after-treatment system for the cleanup of regulated and unregulated pollutants from an exhaust of a diesel engine, the system comprising:
    a diesel particulate converter having an agglomerator for the agglomeration of particulate matter and a separator for the separation of particulate matter, the agglomerator constructed of composite wire mesh media; and
    a soot collection chamber for collecting and retaining entrapped soot;
    wherein the diesel particulate converter for the agglomeration and separation of particulate matter from the exhaust includes:
    a housing;
    a centrifugal separator having a core pipe radially centered in the housing, the core pipe having a plurality of windows for capturing clean exhaust streams; and
    a plurality of helical augers extending from the core to the agglomerator such that the exhaust enters the centrifugal separator at an upstream end, is then forced into a cyclonic helical motion and exits at a downstream end;
    wherein the centered core pipe captures and collects clean exhaust layers in a progressive manner as such clean layers develop through the plurality of windows; and
    wherein the windows are configured to have openings extending from a middle of the flow channel toward the auger, the openings stopping short from the auger, thereby preventing re-entry of fugitive particulates caused by swirl phenomenon.

\* \* \* \* \*